United States Patent [19]

Shibata

[11] Patent Number: 5,781,371
[45] Date of Patent: *Jul. 14, 1998

[54] CASSETTE LOADING MACHANISM

[75] Inventor: Naka Shibata, Saitama, Japan

[73] Assignee: Sony Corporation, Tokyo, Japan

[*] Notice: The term of this patent shall not extend beyond the expiration date of Pat. No. 5,615,066.

[21] Appl. No.: 822,288

[22] Filed: Mar. 20, 1997

Related U.S. Application Data

[62] Division of Ser. No. 568,455, Dec. 7, 1995, Pat. No. 5,615,066, which is a continuation of Ser. No. 209,206, Mar. 4, 1994, abandoned.

[30] Foreign Application Priority Data

Mar. 8, 1993 [JP] Japan .................. 5-070728

[51] Int. Cl.⁶ .................................................. G11B 15/675
[52] U.S. Cl. .................................................. 360/96.5
[58] Field of Search .................. 360/85, 93, 95, 360/96.5

[56] References Cited

U.S. PATENT DOCUMENTS

| | | | |
|---|---|---|---|
| 4,799,117 | 1/1989 | Ohyama | 360/96.5 |
| 5,103,357 | 4/1992 | Nakanishi | 360/96.5 |
| 5,124,854 | 6/1992 | Iyota et al. | 360/96.6 |
| 5,191,494 | 3/1993 | Lee | 360/96.5 |
| 5,615,066 | 3/1997 | Shibata | 360/96.5 |

Primary Examiner—Stuart S. Levy
Assistant Examiner—William J. Klimowicz
Attorney, Agent, or Firm—Jay H. Maioli

[57] ABSTRACT

A cassette loading mechanism comprising a first cassette loading mechanism for drawing a cassette holder with a tape cassette detachably loaded to a position over a cassette loading portion and then positioning the cassette holder down to the cassette loading portion and a second cassette loading machanism of linear skating type for slidably coupling a slide chassis provided with the cassette loading portion with a fixed chassis provided with a recording/reproducing portion to record or reproduce a recording medium tape of the tape cassette loaded in the cassette loading portion with the slide chassis moved to a retracted position which generally overlaps the fixed chassis. The above-mentioned setup implements a cassette loading mechanism of front-loading type based on a small-sized, light-weight recording/reproducing apparatus of linear skating type.

1 Claim, 24 Drawing Sheets

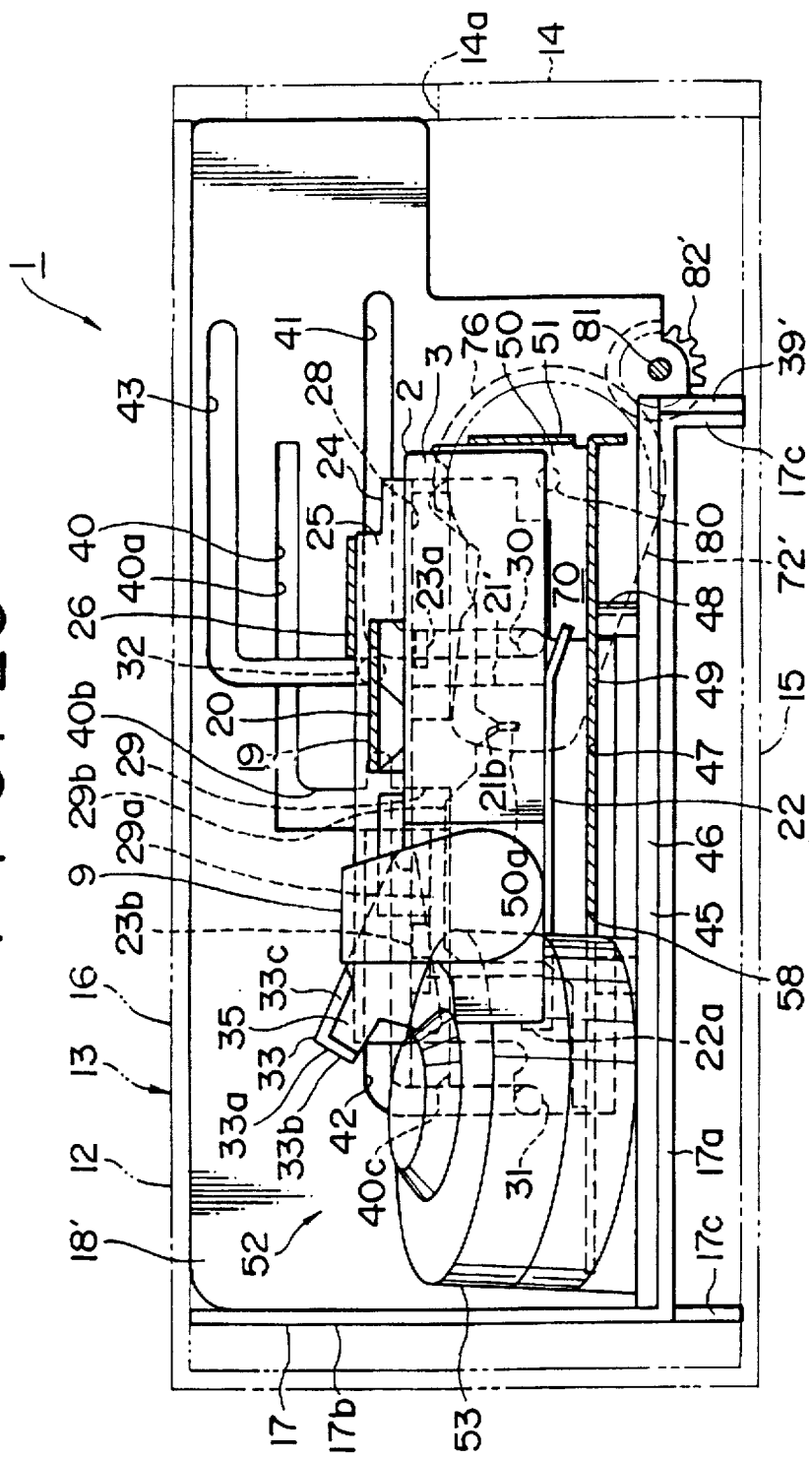

CASSETTE LOADING MACHANISM

This is a division of application Ser. No. 08/568,455 filed Dec. 7, 1995, now U.S. Pat. No. 5,615,066, which is a continuation of application Ser. No. 08/209,206 filed Mar. 4, 1994, now abandoned.

BACKGROUND OF THE INVENTION

1. Field of the Invention

The present invention generally relates to a cassette loading mechanism and, more particularly, to a cassette loading mechanism for use on a mechanical deck of front-loading type based on a compact and light-weight video recording and/or reproducing apparatus of linear skating type built in a consumer-use video camera.

2. Description of the Related Art

Conventionally, stationary-type video tape recorders are large in size and heavy even if they use a small-sized recording medium such as an 8-mm tape cassette.

Use of a recording and/or reproducing apparatus built in a consumer-use, small-sized 8-mm video camera or the like makes it possible to fabricate a small-sized, light-weight video tape recorder. However, most recording and/or reproducing apparatuses used on existing 8-mm video cameras such as one mentioned above are of a pop-up, linear skating type in which a tape cassette is loaded from the top of a mechanical deck with a resting surface of the tape cassette held horizontally (for example, a linear skating device of the pop-up type is disclosed in European Patent Publication No. EP0400944, A2 published on Dec. 5, 1990).

However, as for the recording and/or reproducing apparatuses of the stationary type used along with a television monitor at home, the front-loading type is more widely accepted than the pop-up type because of ease of handling of tape cassettes.

Also, since the conventional front-loading-type recording and/or reproducing apparatuses are integrally provided with a mechanism which moves a tape cassette first horizontally and then vertically, it has been impossible to apply small-sized, light-weight linear skating mechanisms (as disclosed in U.S. Pat. Nos. 4,706,141 and 4,796,115 for example) to such apparatuses.

OBJECTS AND SUMMARY OF THE INVENTION

It is therefore an object of the present invention to provide a cassette loading mechanism of front-loading type based on a small-sized, light-weight recording and/or reproducing apparatus of linear skating type.

In carrying out the invention and according to one aspect thereof, there is provided a cassette loading mechanism comprising a first cassette loading mechanism for drawing a cassette holder with a tape cassette detachably loaded to a position over a cassette loading portion and then positioning the cassette holder down to the cassette loading portion and a second cassette loading mechanism of linear skating type for slidably coupling a slide chassis provided with the cassette loading portion with a fixed chassis provided with a recording and/or reproducing portion to record or reproduce a recording medium tape of the tape cassette loaded in the cassette loading portion with the slide chassis moved to a retracted position which generally overlaps the fixed chassis.

Although the cassette loading mechanism practiced as a preferred embodiment described herein is one that loads a tape cassette having two lids for opening or closing a tape draw-out surface, the present invention is not in any manner limited to such a type but applicable to any cassette loading mechanism for loading tape cassettes of various types.

The above and other objects, features and advantages of the present invention will become more apparent from the following detailed description when read in conjugation with the accompanying drawings, in which like reference numerals are used to identify the same or similar parts in several views.

BRIEF DESCRIPTION OF THE DRAWINGS

FIG. 25 is a side view illustrating the main portion of the cassette loading mechanism in a state subsequent to the state of FIG. 24.

DETAILED DESCRIPTION OF PREFERRED EMBODIMENTS

Figure 1:
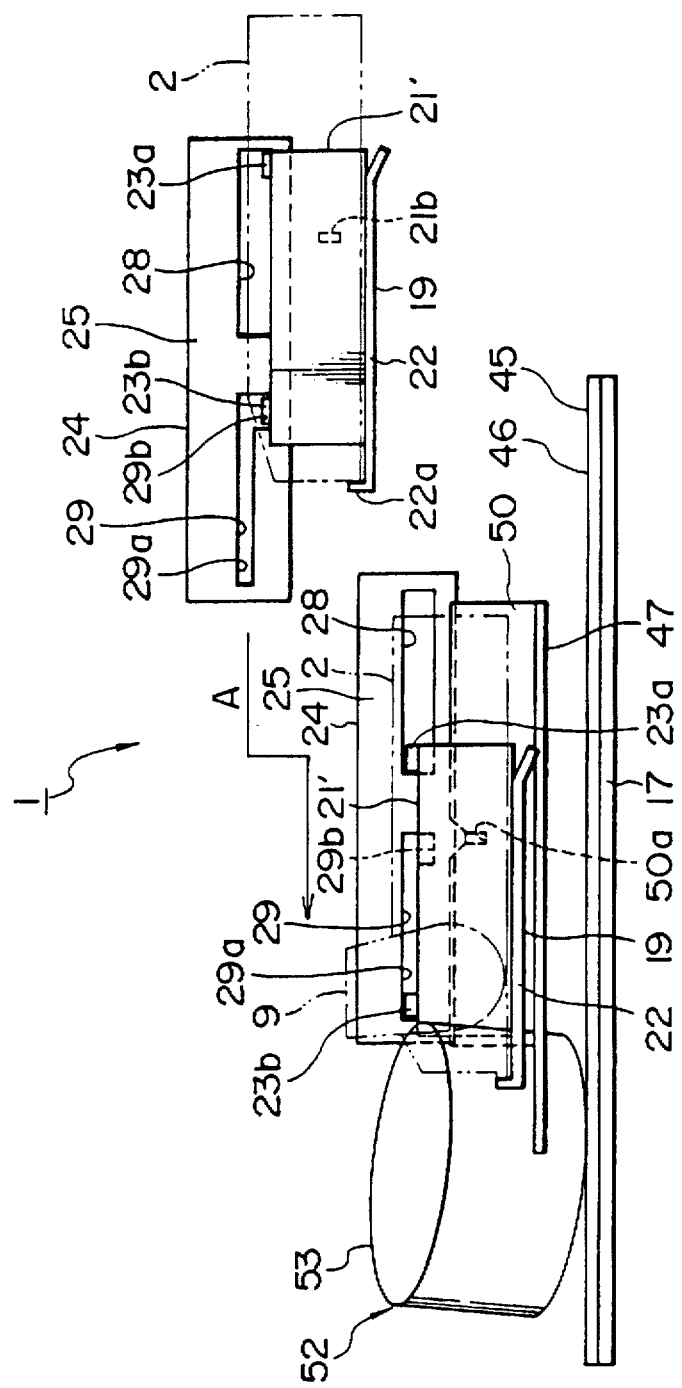
FIG. 1 is a diagrammatic side view for describing an operation of the cassette loading mechanism practiced as a preferred embodiment of the invention.

The cassette loading mechanism practiced as a preferred embodiment of the present invention will be described in detail with reference to the accompanying drawings.

It should be noted that the illustrated embodiment is one applied to a tape player that uses an 8-mm tape cassette provided with two lids for exposing and closing a tape draw-out surface.

Now, referring to FIG. 1, how a tape cassette is conveyed by the cassette loading mechanism according to this invention into a cabinet of a tape player will be described briefly, followed by description of the tape cassette and a tape cassette loading mechanism 1.

A tape cassette 2 inserted at a front opening of the tape player cabinet is placed on a cassette holder 19. The cassette holder 19, held by a housing 24, moves first horizontally and then vertically. Then, the cassette holder 19 is released from the housing 24 while holding the tape cassette 2 and is engaged with a slide chassis 47 of a mechanical chassis 45.

In this way, a first loading operation has been performed. Upon completion of the first loading operation, a second loading operation is activated by a selector switch, not shown.

In the second loading operation, the slide chassis 47, engaged with the cassette holder 19 holding the tape cassette 2, moves over a fixed chassis 46 toward a head drum 53 and stops at a predetermined position. This position is a recording and/or reproducing position at which a recording and/or reproducing operation can be made on a magnetic tape 5 housed in the tape cassette 2.

As mentioned above, the operation of the cassette loading mechanism 1 of the invention is characterized by the fact the cassette holder 19 holding the tape cassette 2 is fed into the tape player cabinet via a path indicated by arrow A in FIG. 1. Now, each portion of the cassette loading mechanism will be described in detail.

Figure 8:
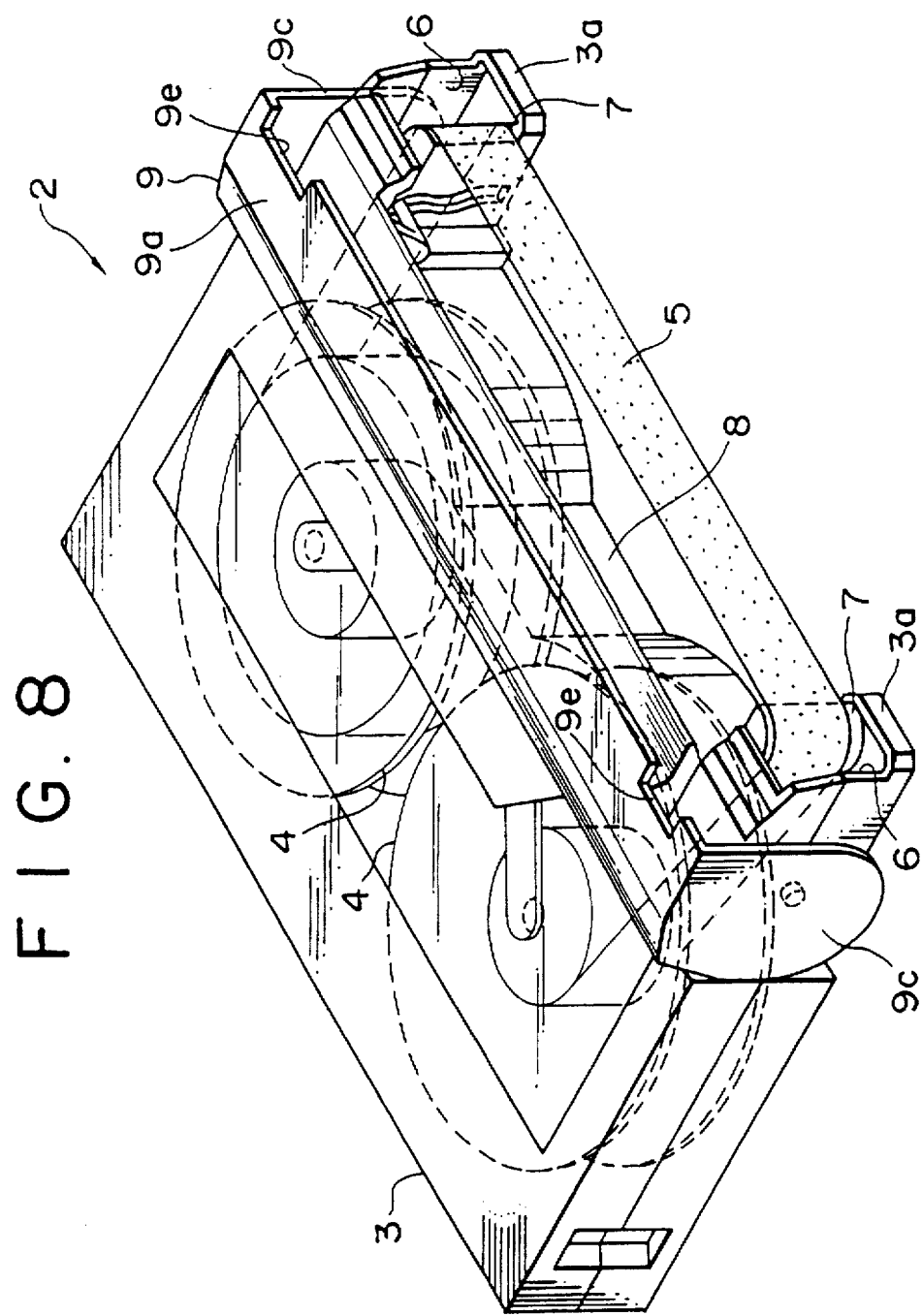
FIG. 8 is a perspective view of a tape cassette.
Figure 9:
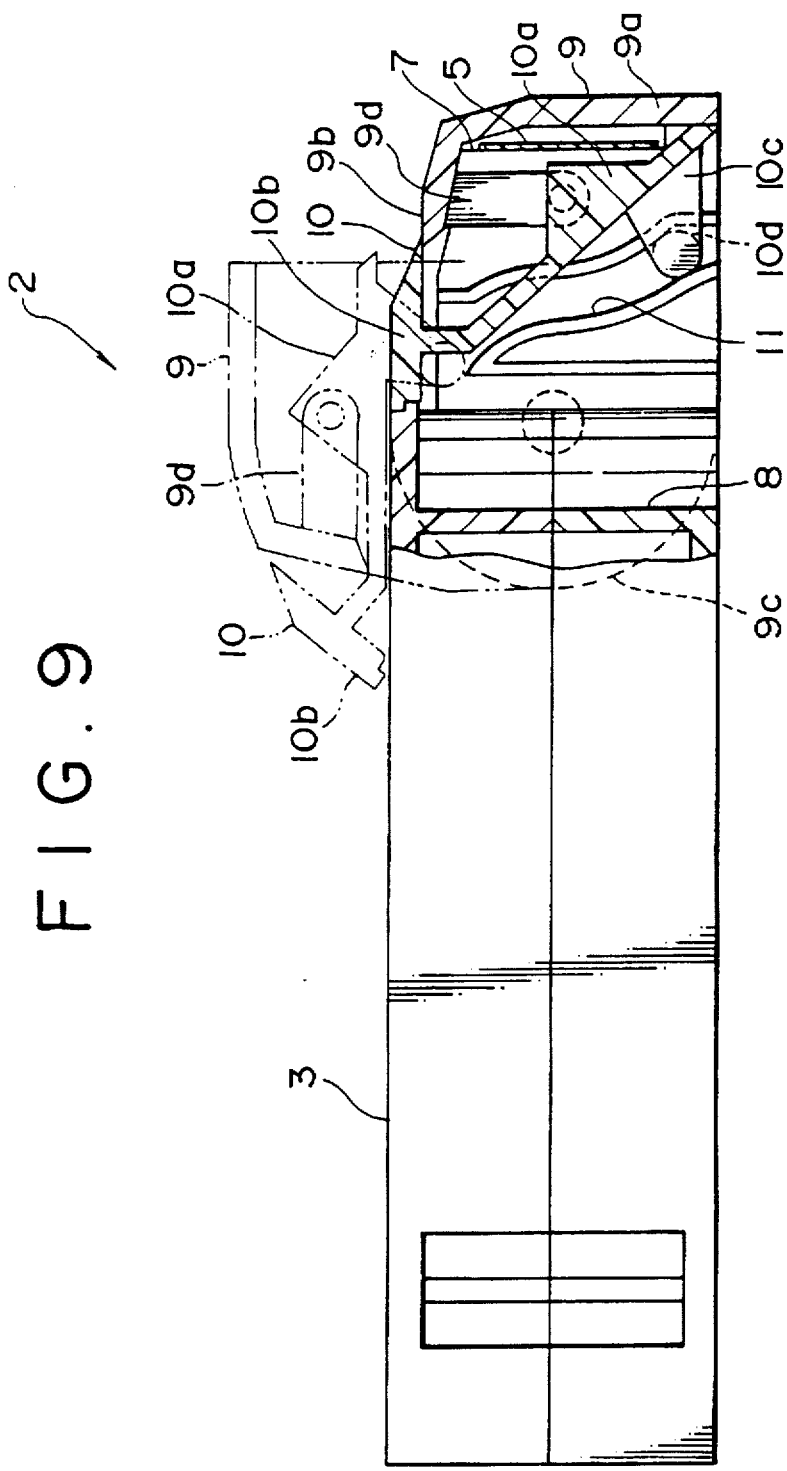
FIG. 9 is a partial cutaway view of the tape cassette.
Figure 10:
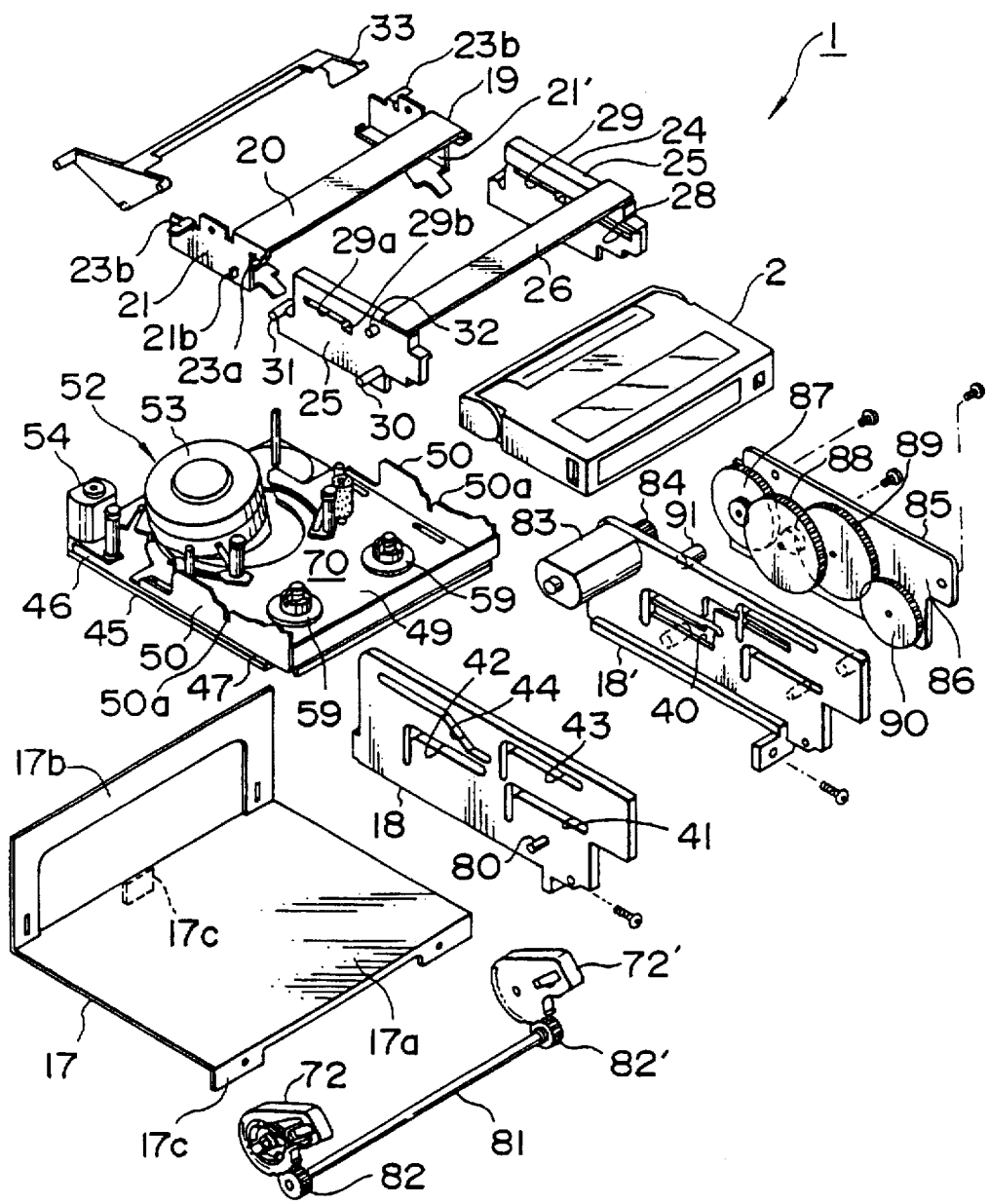
FIG. 10 is an exploded view of the entire mechanical chassis.

Referring to FIGS. 8 and 9, reference numeral 2 indicates the tape cassette.

The tape cassette 2 has a cassette case 3 formed into a relatively thin box of a generally rectangular shape when viewed from a direction along thickness of the tape cassette 2. The tape cassette 2 rotatably accommodates a pair of reels 4, 4 around which a magnetic tape 5 is wound.

Tape exits 6, 6 are disposed on left and right ends of a front surface 7 (hereinafter referred to as a tape draw-out surface) of the cassette case 3. The magnetic tape 5 unwound from one tape reel 4 runs from one tape exit 6 out of the cassette case 3 along the tape draw-out surface 7 into the cassette case again at the other tape exit 6 to be wound around the other tape reel 4.

The tape draw-out surface 7 is formed with a recess 8 between the tape exits 6, 6. The recess 8, herein after called a mouth, is open to front, upper and lower sides of the tape cassette 2.

A main covering 9 (hereinafter referred to as a front lid) is pivotally provided on the tape cassette to expose or close the tape draw-out surface 7. The front lid 9 comprises a main portion 9a formed into a plate of a size that covers the tape draw-out surface 7, an upper surface portion 9b that projects from an upper rim of a portion of the main portion 9a except both ends thereof toward the back of the cassette case 3 and has a size covering an upper front portion of the mouth 8, and side portions 9c, 9c that project from both ends of the main portion 9a toward backward of the cassette case 3. The side portions 9c, 9c are pivotally secured on both sides of the cassette case 3. Consequently, the front lid 9 pivotally moves between a closed position indicated by solid lines in FIG. 9 and an open position indicated by lines composed of alternating long dashes and double short dashes. At the closed position, the main portion 9a covers the upper front portions of the tape draw-out surface 7 and the mouth 8. At the open position, the upper front portions of the tape draw-out surface 7 and the mouth 8 are exposed. The front lid 9 is also pivotally pressed toward the closed position by spring means, not shown and is locked at the closed position by a locking member, not shown.

A covering 10 (hereinafter referred to as a back lid) is provided to cover from the back of the tape cassette 3 the magnetic tape 5 running along the front of the mouth 8. The back lid 10 comprises a main portion 10a formed into a horizontally long plate, an upper surface portion 10b which continues at a center along width thereof to the main portion 10a at a top thereof, arms 10c, 10c projecting from left and right sides of a lower end of the main portion 10a generally toward the back of the tape cassette, and guided projections 10d, 10d projecting from rear ends of the arms 10c to outside the tape cassette. Left and right ends at the generally intermediate portion along the height of the main portion 10a are pivotally supported on lower ends of support portions 9d downward provided on the upper surface 9b of the main portion 9a of the front lid 9. The guided projections 10d, 10d are slidably engaged with guide grooves 11, 11 running generally along the height of the mouth 8 on both left and right insides thereof.

Consequently, the back lid 10 moves with the generally intermediate portion along the height of the main portion 10a drawing an arc integrally with the front lid 9. At the same time, the guided projections 10d, 10d moves generally vertically. When the front lid 9 is at the closed position, the main portion 10a, tilted backward, opposes the main portion 9a of the front lid 9 from backward as indicated by solid lines in FIG. 9. And the upper surface is held at the closed position that covers an upper rear portion of the mouth 8. When the front lid moves to the open position, the main portion 10a moves to the open position where the main portion 10a is held slightly higher than the upper surface of the cassette case 3 and generally horizontally as indicated by lines composed of alternating long dashes and double short dashes.

It should be noted that the back lid 10 at the closed position is inside the mouth 8 when viewed from the top of the cassette case.

Thus, when the front lid 9 is at the closed position, the front and upper surfaces of the mouth 8 are covered by the front lid 9 and the back lid 10. At the same time, a portion of the magnetic tape 5 exposed outside the cassette case 3 is positioned and protected in a space formed by the front lid 9 and the back lid 10.

The tape cassette 2 thus constituted is inserted in a cassette holder to be described of the cassette loading mechanism 1 with the front lid 9 being at the closed position. During cassette loading, the front lid 9 and the back lid 10 are moved to the open position.

The main portion 9a of the front lid 9 is formed with notches 9e, 9e at positions toward left and right ends of a lower end rim of the main portion 9a as shown in FIG. 8. A portion of a front wall of the cassette case 3 is formed so that abutting portions 3a, 3a of the portion of the front wall corresponding to the notches 9e, 9e are exposed to the front of the cassette case 3 even when the front lid 9 is at the closed position.

Figure 16:
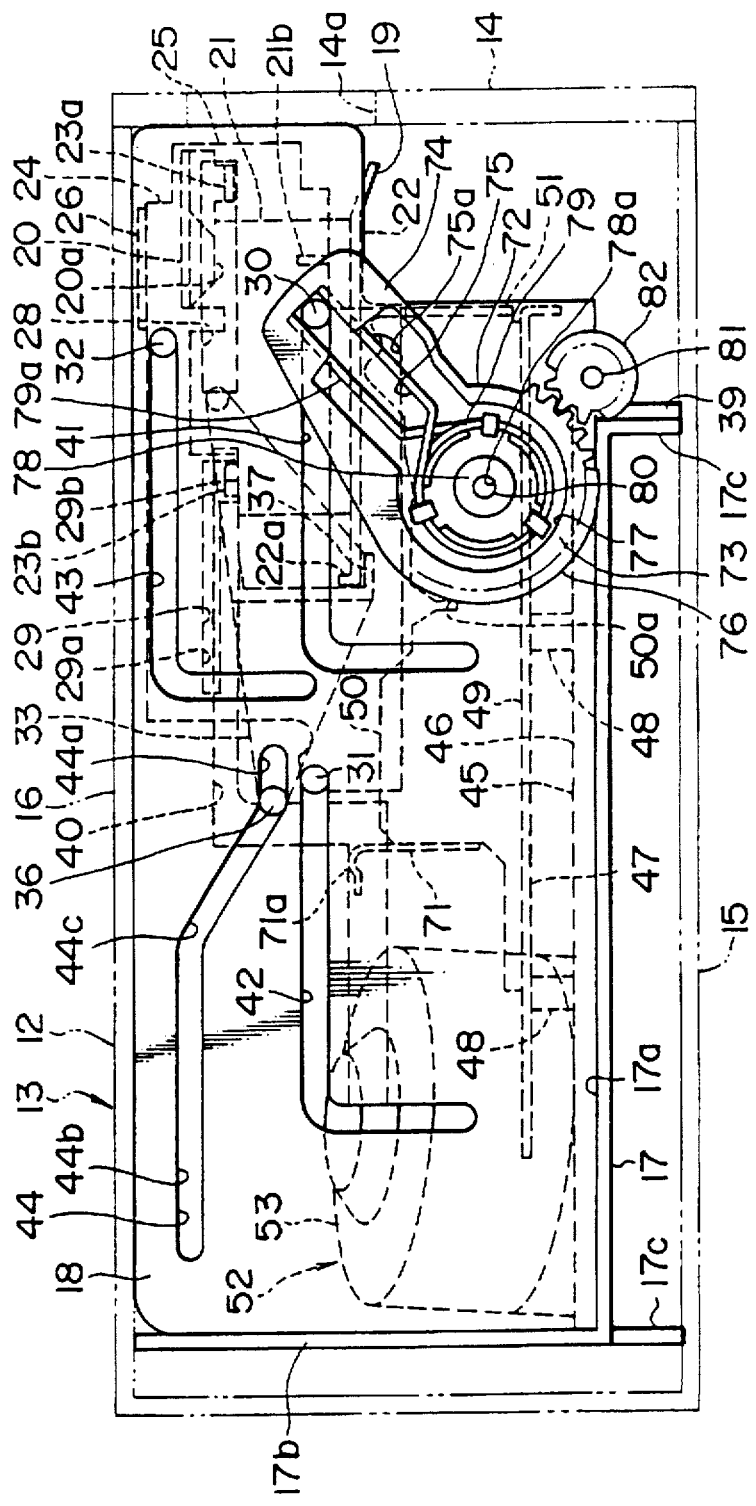
FIG. 16 is a side view of the mechanical chassis.
Figure 17:
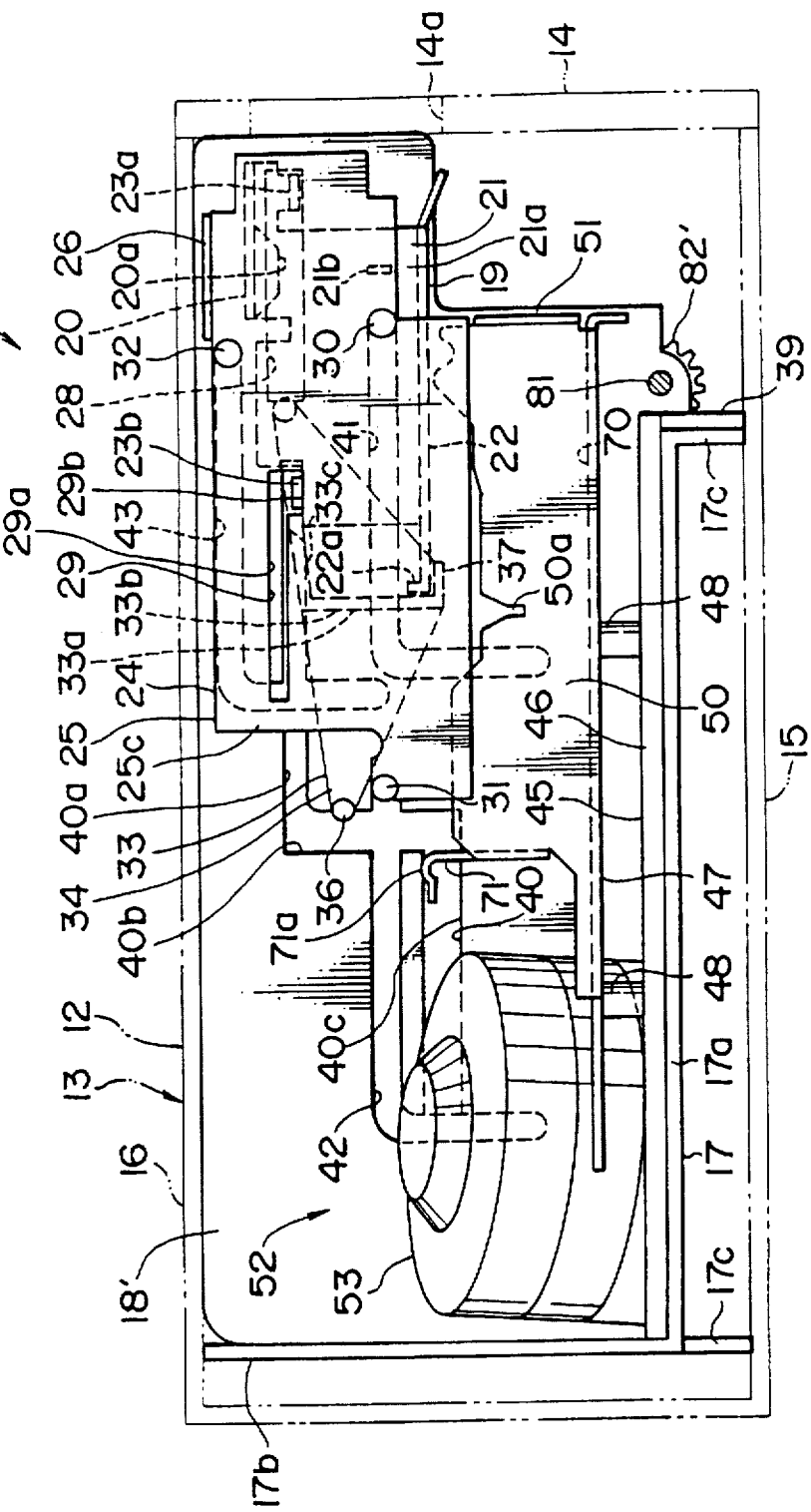
FIG. 17 is a side view illustrating the mechanical chassis with a support wall on this side shown in FIG. 16 removed.
Figure 18:
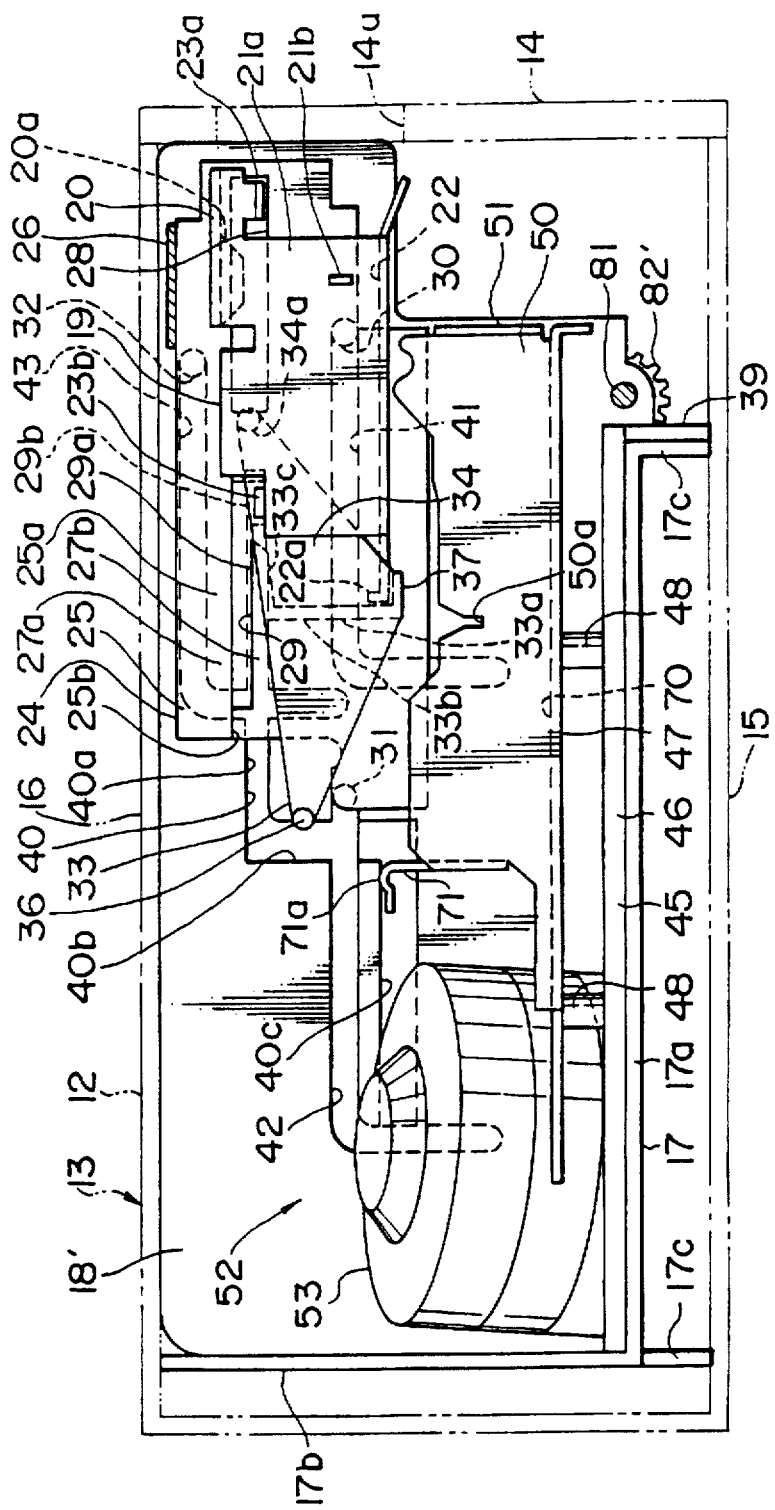
FIG. 18 is a side view of the mechanical chassis with a housing side wall plate on this side shown in FIG. 17 removed.
Figure 19:
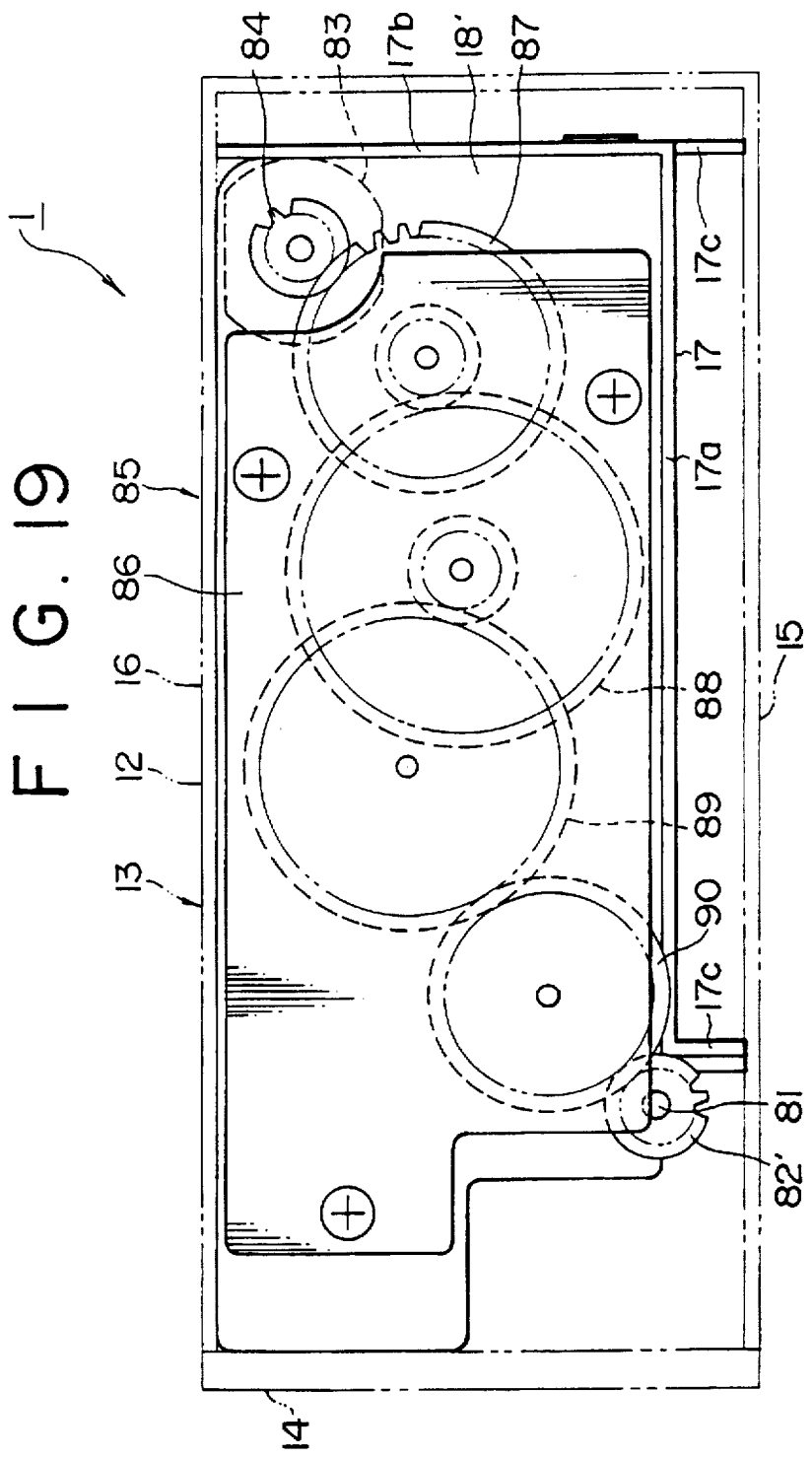
FIG. 19 is a side view illustrating the driving portion.

Referring to FIG. 16, an external housing 12 is provided on the tape player 13 that uses the above-mentioned tape cassette 2. Situated inside the external housing 12 are necessary devices such as a cassette loading portion on which the tape cassette 2 is detachably loaded and the cassette loading mechanism 1 for loading or unloading the cassette 2 into or from the cassette loading portion.

The external housing 12 includes a front wall 14, bottom plate 15, and a top plate 16. A cassette loading opening 14a is formed in the front wall 14 at a position toward an upper end thereof. Through the opening 14a, the cassette holder to be described containing the tape cassette 2 is loaded or unloaded.

A main chassis 17 constituting a base for the cassette loading portion is composed of a floor plate 17a and back plate 17b. The floor plate 17a is provided with mounting legs 17c, 17c, 17c adapted to be fixed to the bottom plate 15 so that the floor plate 17a is held slightly higher than the bottom plate 15 in a generally horizontal manner.

A mechanical chassis of linear skating type to be described is situated on top of the floor plate 17a.

Figure 2:
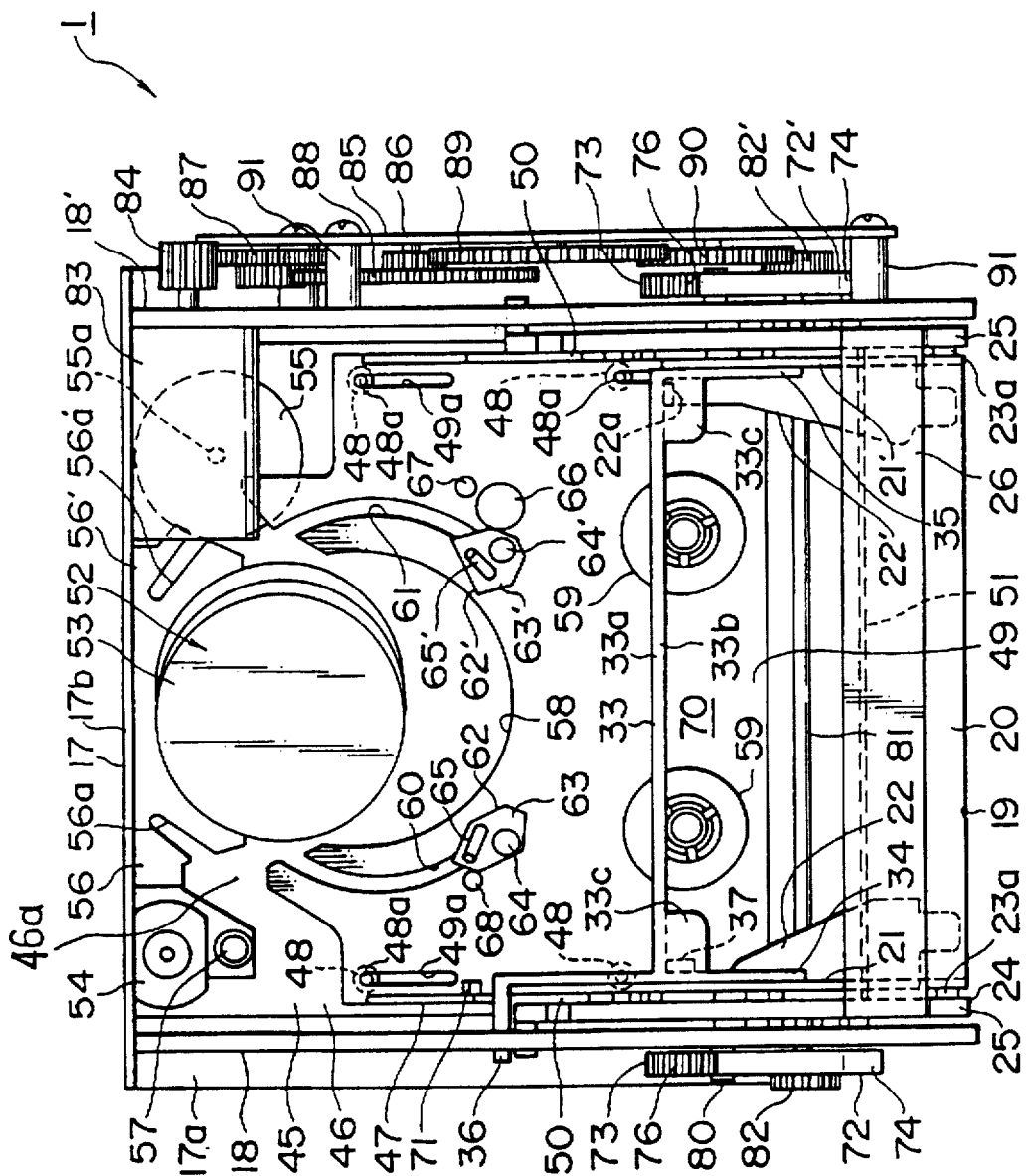
FIG. 2 is a top view illustrating an entire tape player in an initial state.
Figure 3:
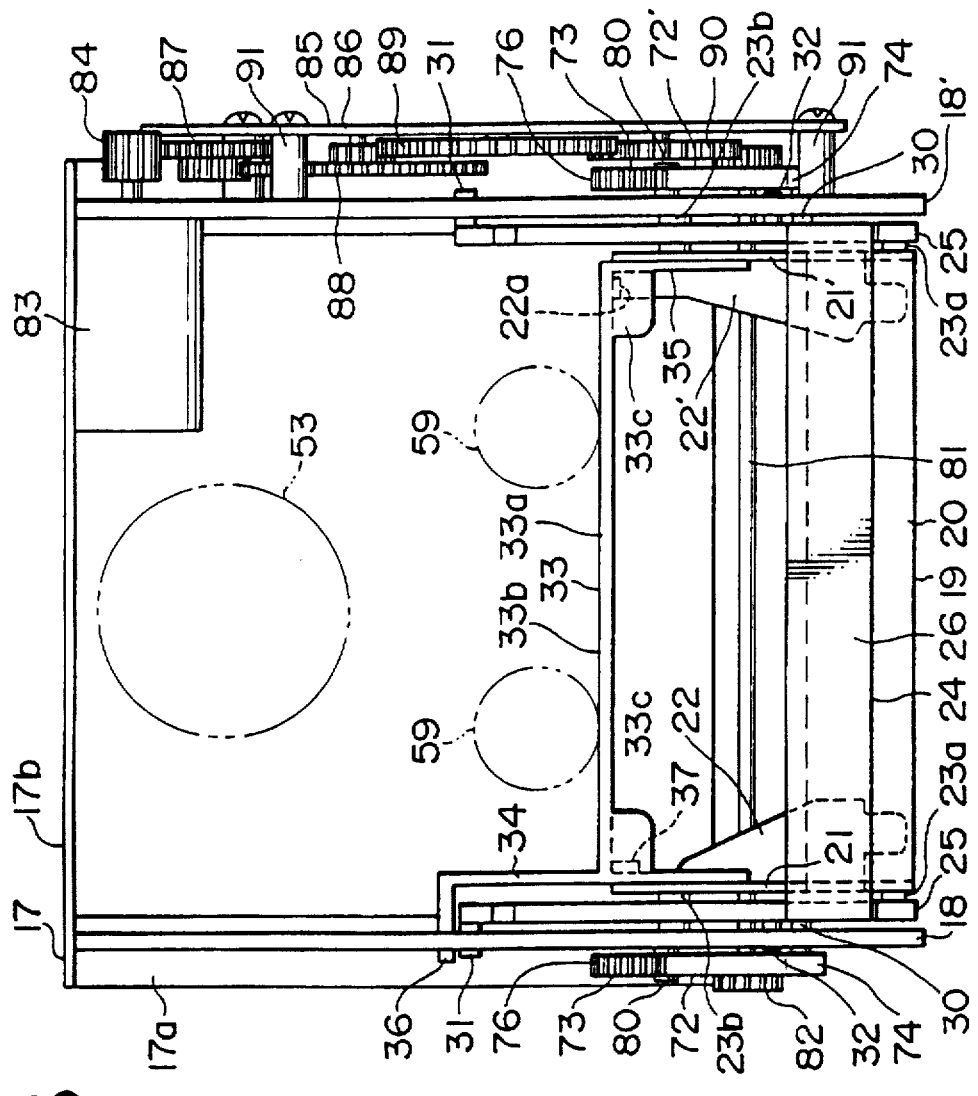
FIG. 3 is a top view illustrating the first cassette loading mechanism.
Figure 4:
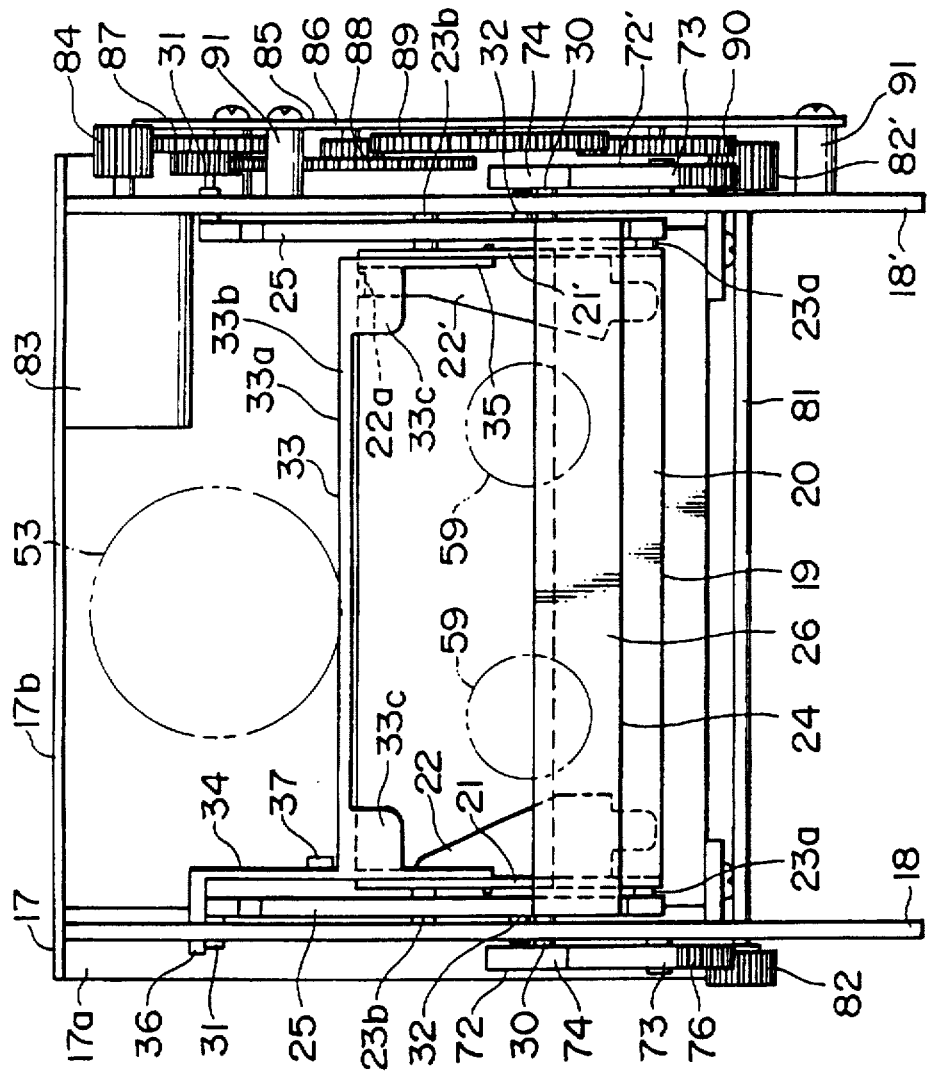
FIG. 4 is a top view illustrating a state with the cassette holder retracted from a state shown in FIG. 3.

Referring to FIG. 2, support walls 18 and 18' are provided on the left and right sides of the above-mentioned main chassis to support the cassette holder to be described and other members. It should be noted that the left side is the side toward the left in FIG. 2 and the right side is the side toward the right in the same figure.

It should also be noted that the rear side of the main chassis is the direction toward the upper end of the drawing of FIG. 2 while the front side is the direction toward the lower end of the drawing. The support walls 18 and 18' stand up to the top plate 16 of the external housing 12 and extend from the front side to the rear side of the main chassis.

Details of the support walls 18 and 18' will be described later in detail.

Figure 12:
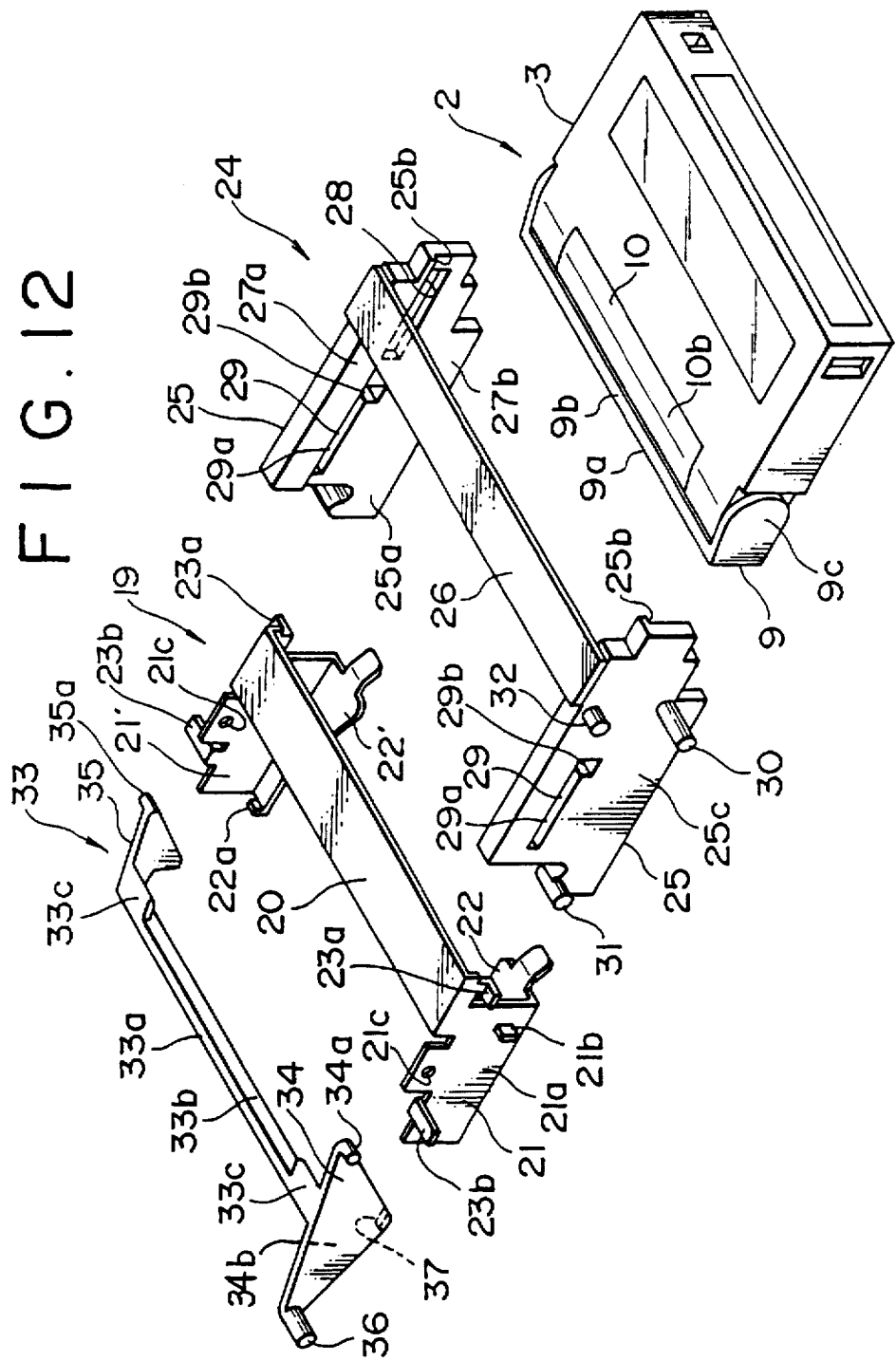
FIG. 12 is an exploded view of a cassette holder portion.

A cassette holder 19 is provided to hold and carry the tape cassette 2. The cassette holder 19 has a section in which the tape cassette 2 is accommodated generally snugly. Referring to FIG. 12, the cassette holder 19, made of a metal sheet, is integrally composed of a top plate 20, long in the left-right direction, side plates 21 and 21', long in the front-back direction, and bottom plates 22 and 22' extending from lower ends of the side plates 21 and 21' to the inside of the cassette holder.

A lining plate 20a made of synthetic resin is fixedly attached on the top panel 20 at the lower surface thereof.

The length of the side plates 21 and 21' is about a half of the length of the tape cassette 2 in the front-back direction. The height of the side plates 21 and 21' is slightly greater than the thickness of the tape cassette 2.

The side plates 21 and 21' are protrusively provided with two pairs of guide pins 23a, 23a, and 23b, 23b on the external surfaces 21a, 21a respectively. In each pair of the guide pins, the rear pins 23b, 23b (hereinafter referred to as the first guide pins) are longer than the front pins 23a, 23a and are rectangular in their cross sections. The pairs of guide pins 23a, 23a, and 23b, 23b horizontally project from the external surfaces 21a, 21a at positions slightly higher than the center along the height of the side plates 21, 21' and at the same horizontal level.

The tape cassette 2 is detachably inserted in the cassette holder 19 constituted as mentioned above.

The tape cassette 2 is inserted in the cassette holder 19 with the front lid 9 directed toward the back of the tape player (with the tape cassette in this orientation it is said that the tape cassette is in the normal direction). The tape cassette 2 is inserted until one of the above-mentioned cassette case's projections 3a, 3a, that is, on the right side of the tape player with the tape cassette 2 in the normal direction, runs up against a stopper 22a provided on the bottom plate 22' of the cassette holder 19.

When the tape cassette 2 has been fully inserted in the cassette holder 19 as mentioned above, the left and right sides of the cassette case 3 lightly touch the inside surfaces of the side plates 21, 21', defining a position of the tape cassette 2 relative to the cassette holder 19 in the left-right direction.

A position of the tape cassette 2 relative to the cassette holder 19 in the up-down direction is defined when the upper surface of the tape cassette 2 lightly touches the lining plate 20a of the top panel 20 and the bottom of the tape cassette 2 rests on the bottom plates 22, 22'.

It should be noted that, in the process of inserting the tape cassette 2 in the cassette holder 19, an opening-preventing locking member, not shown, locking the front lid 9 to the closed position is abutted against an unlocking projection, not shown, formed on the bottom plate 22 which is caused to be pressed relatively forward. Consequently, when the opening-preventing locking member is moved to an unlocked position, it allows the two lids 9 and 10 to move to the open position.

Figure 7:
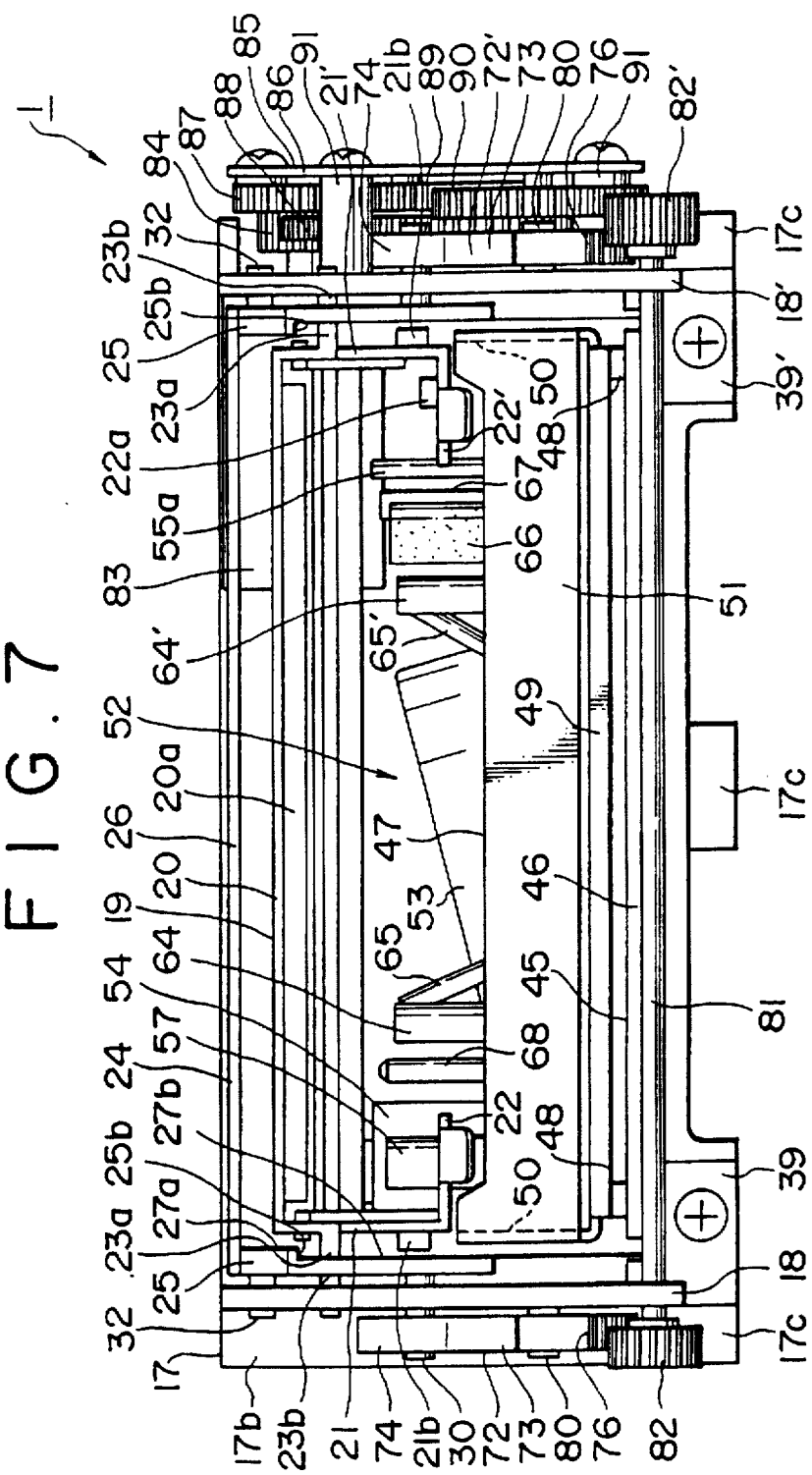
FIG. 7 is an enlarged front view of the mechanical chassis.

A housing 24 is provided for holding the cassette holder 19 in the left-right direction. The housing 24 is composed of two side wall plates 25, 25 and a top plate 26 fixedly spanning them at the tops thereof as shown in FIGS. 7 and 12. The housing 24 is of a size that fully accommodates the cassette holder 19.

The side wall plate 25 (hereinafter, only one of the side wall plates 25, 25 will be described because both are the same in plane symmetry) of the housing 24 is formed with a downward shoulder 25b on an inner surface 25a of the side wall plate 25. The inner surface 25a divides the inner surface 25a into an upper portion 27a and a lower portion 27b.

Slide grooves 28 and 29 are situated on an upper rim of the lower portion 27b. The slide groove 29, which is in back of the slide groove 28, is formed with a slit 29a and a stopper 29b which continues from a lower rim of the front end of the slit 29a as shown in FIG. 12. The stopper 29b is generally as deep as a height of the slip 29a and penetrates the side wall plate 25 from the inner surface 25a to an outer surface 25c. The slide groove on the front side is a rectangular groove running in the front-back direction. The space between the slide grooves 28 and 29 is the same as the space between the guide pins 23a and 23b of the cassette holder 19.

The slide grooves 28 and 29 are on the same level at their upper rims. A lower rim of the slide groove 28 and a lower rim of the stopper 29b of the slide groove 29 are on a the same level.

The slide grooves 28 and 29 are the same in length.

The side wall plate 25 of the housing 24 is protrusively provided with three guide pins 30, 31 and 32 on the outer surface 25c of the side wall plate 25. The front guide pin 30 (hereinafter referred to as a second guide pin) is made longer than the other guide pins 31 (a third guide pin) and 32 (a fourth guide pin).

Referring to FIG. 12, a first lid-opening member 33 is provided. The first lid-opening member 33 is composed of a main portion 33a and arms 34 and 35 integrally formed on left and right sides thereof. The main portion 33a is composed of a narrow front plate 33b and top plates 33c, 33c on both sides thereof projecting to the front.

Engaging pins 34a and 35a projects from the arms 34 and 35 at front ends thereof toward the outside of the housing 24.

The arm 34 extends back beyond a rear surface of the main portion 33a and ends with a guide pin 36 (a fifth guide pin) projecting toward the outside of the housing 24, the fifth guide pin being longer than the engaging pin 34a.

When viewed from the left-right side of the housing 24, the arm 34 has a triangular shape with one corner pointing down. The engaging pin 34a and the fifth guide pin 36 are located at the upper corners of the triangular shape and a lid-opening projection 37 is provided at the lower corner of the triangular shape on an inner surface 34b.

The above-mentioned engaging pins 34a and 35a engage with an engaging hole 21c formed in the side plates 21 and 21' at their upper center, thereby supporting the first lid-opening member 33 on the cassette holder 19 pivotally.

The cassette holder 19 is supported on the housing 24 by slidably engaging the guide pins 23a, 23a, 23b, 23b of the side plates 21 of the cassette holder 19 with the slide grooves 28 and 29 formed on the side wall plates 25 of the housing 24.

The guide pins 23b, 23b of the cassette holder 19 are locked with the stoppers 29b below the slits 29a on front ends of the slide grooves 29 of the side wall plates 25 of the housing 24 to prevent the cassette holder 19 from sliding in the front-back direction, thereby holding the housing 24 and the cassette holder 19 such that they follow the same sliding locus when they operate as will be described.

Figure 11:
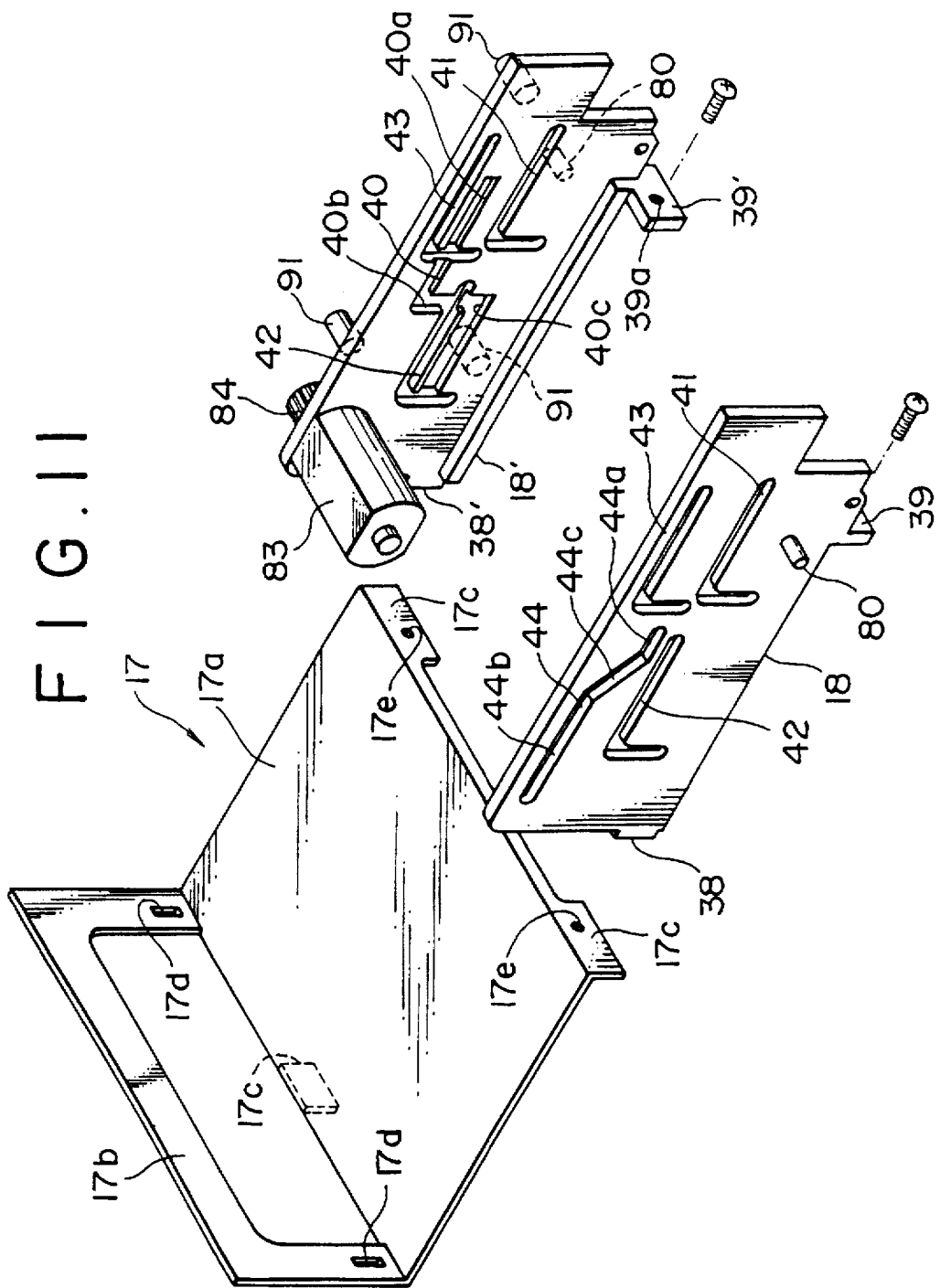
FIG. 11 is an exploded view of a main chassis portion.

Further, the guide pins 23b penetrate the slide grooves 29 of the housing 24 toward the outside thereof to be regulated by guide grooves formed in the support walls 18 and 18' as shown in FIG. 11.

The support walls 18 and 18' are formed with engaging projections 38 and 38' at a lower back end thereof and engaging portions 39 and 39' at near a lower front end thereof.

The engaging projections 38 and 38' of the support walls 18 and 18' are mated with the engaging holes 17d, 17d formed on the lower left and right sides of the back plate 17b of the main chassis 17. As shown in FIG. 11, screws put through through-holes 39a formed in the engaging portions 39 and 39' are threaded into threaded holes 17e formed in the mounting legs 17c, 17c provided at the left and right sides of the front side of the floor plate 17a of the main chassis 17, thereby fixing the support walls 18 and 18' onto the main chassis 17 in a standing manner.

The support walls 18 and 18' are formed with guide grooves with which the guide pins 30, 30, 31, 31, 32, 32 of the housing 24 accommodating the cassette holder 19 and the guide pins 23b, 23b of the cassette holder 19 passing through the slide grooves 29, 29 of the housing 24 engage slidably. At the same time, the guide pin 36 of the first lid-opening member 33 is slidably fitted in a guide groove formed in the support wall 18.

To be more specific, the support walls 18 and 18' are formed with guide grooves 40, 40 (hereinafter referred to as first guide grooves) for the first guide pins 23b, 23b, guide grooves 41, 41 (second guide grooves) for the second guide pins 30, 30, guide grooves 42, 42 (third guide grooves) for the third guide pins 31, 31, and guide grooves 43, 43 (fourth guide grooves) for the fourth guided pins 43, 43. The support wall 18 is additionally formed with a guide groove 44 (a fifth guide groove) for the fifth guide pin 36. The first guide grooves 40, 40 are formed on the support walls 18, 18' on facing sides into square grooves. The second through fifth guide grooves 41, 41, 42, 42, 43, 43, and 44 are formed into long through-holes.

The first guide grooves 40, 40 extend in the shape of a crank. The second through fourth guide grooves 41, 41, 42, 42, and 43, 43 extend in shape to the general shape of an "L" rotated by 90 degrees clockwise. The fifth guide groove 44 is sequentially composed of a horizontal portion 44a at the front, a sloping portion 44c at the middle, and a horizontal portion 44b at the back.

Horizontal guides 40a, 40a constituting the first guide grooves 40, 40 are about as deep as the length of the first guided pins 23b, 23b.

Vertical guides 40b, 40b also constituting the first guide grooves 40, 40 and continuing from the horizontal guides 40a, 40a are about as wide as the guide pins 23b and 23b. Horizontal guides 40c, 40c also constituting the first guide grooves 40, 40 and continuing from the vertical guides 40b, 40b extend toward the back and are almost twice as deep as the guide pins 23b, 23b.

Consequently, movements of the first guide pins 23b, 23b are always regulated by the first guide grooves 40, 40. That is, the first guide pins 23b, 23b are first guided from the front ends of the guide grooves 40, 40 by the horizontal guides 40a, 40a, then by the vertical guides 40b, 40b, and finally by horizontal guides 40c, 40c to the back ends of the guide grooves 40, 40.

The second guide pins through the fourth guide pins are guided by the second guide grooves through the fourth guide grooves respectively first horizontally and then vertically toward the ends of these grooves.

The fifth guide pin 36 is guided by the fifth guide groove backward slightly, then diagonally upward, and finally horizontally backward again.

Thus, the guide grooves 40, 40, 41, 41, 42, 42, 43, 43, and 44 are slidably engaged with the guide pins 23b, 23b, 30, 30, 31, 31, 32, 32, and 36 respectively.

The above-mentioned setup holds the housing such that the cassette holder 19 moves between the support walls 18, 18' along a locus having a shape of an "L" rotated by 90 degrees clockwise.

Further, since the cassette holder 19 is moved backward by the mechanical chassis of linear skating type to be described, a locus drawn by cassette holder's movement becomes crank-shaped.

Thus, the tape cassette 2 placed in the cassette holder 19 is moved to the recording and/or reproducing position.

Referring to FIG. 2 for example, a main chassis 45 of linear skating type is situated on the floor plate 17a of the main chassis 17. The mechanical chassis 17 is composed of the fixed chassis 46 fixedly secured on the main chassis 17 and the slide chassis 47 slidably secured on the fixed chassis 46.

Figure 5:
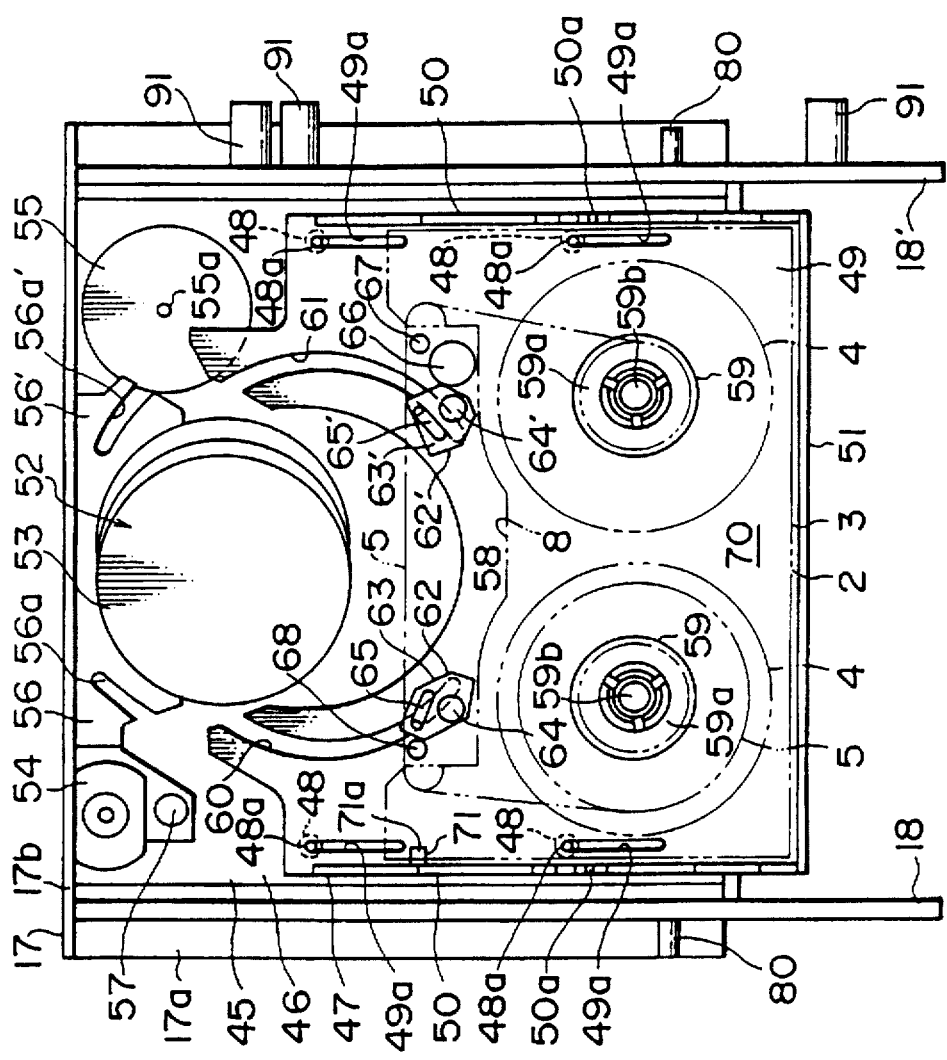
FIG. 5 is a top view illustrating a mechanical chassis.

Referring to FIG. 5, the fixed chassis 46 is larger than the tape cassette 2 by a size in plan dimensions and situated with a rotary head and other members to be described on an upper surface of a main portion 46a which is long along the front-back direction and flat in shape.

The fixed chassis 46 is situated at an upper surface thereof with four standing guide pins 48, two being on the left and right sides, each being separated from the other.

Each guide pin 48 is cylindrical in shape and about one thirds as long as a thickness of the tape cassette 2. Each guide pin 48 is integrally formed at top thereof with a projection 48a smaller in diameter than the guide pin 48.

Figure 13:
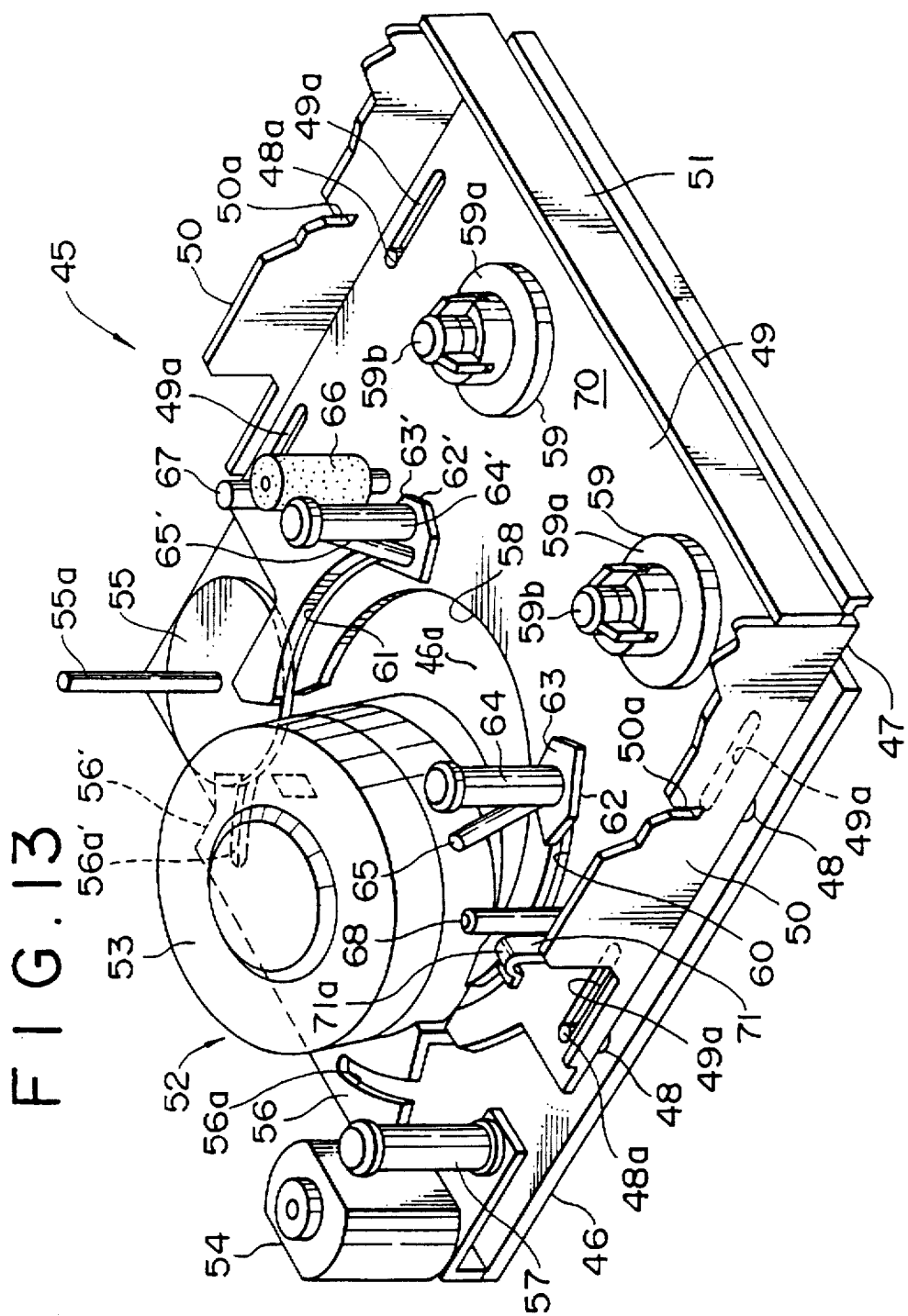
FIG. 13 is a perspective view of a part of the mechanical chassis.
Figure 14:
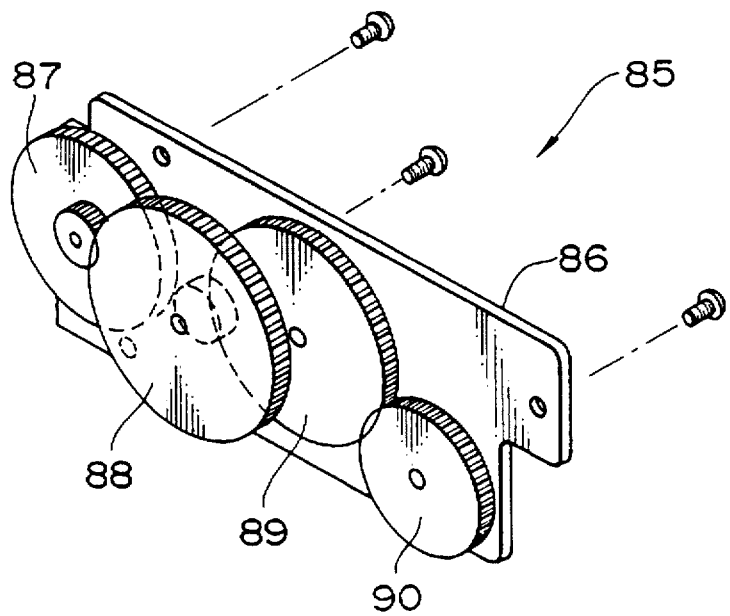
FIG. 14 is an exploded view of a driving portion.

Referring to FIG. 13, the slide chassis 47 is composed of a main portion 49 which is flat and generally the same as the fixed chassis 46 in size, side walls 50, 50 rising from left and right rims of the main portion 49, and a front wall 51 rising from a front rim of the main portion 49.

The main portion 49 is formed at the left and right rims thereof with four guide grooves 49a, two on each side, each groove running in the front-back direction. Each guide groove 49a is slidably engaged with each engaging projection 48a on top of each guide pin 48 standing on the fixed chassis 46.

Thus, the slide chassis 47 is slidably secured on the fixed chassis at a total of four positions, two on each of the left and right sides, each position on each side being spaced from the other in the front-back direction. This setup allows the slide chassis 47, held slightly higher than the fixed chassis 46, to be slidably supported by the fixed chassis 46 in the front-back direction.

Consequently, the slide chassis 47 has a sliding stroke defined by a length of the guide grooves 49a, or generally one fifth as long as the slide chassis along the front-back direction.

Figure 6:
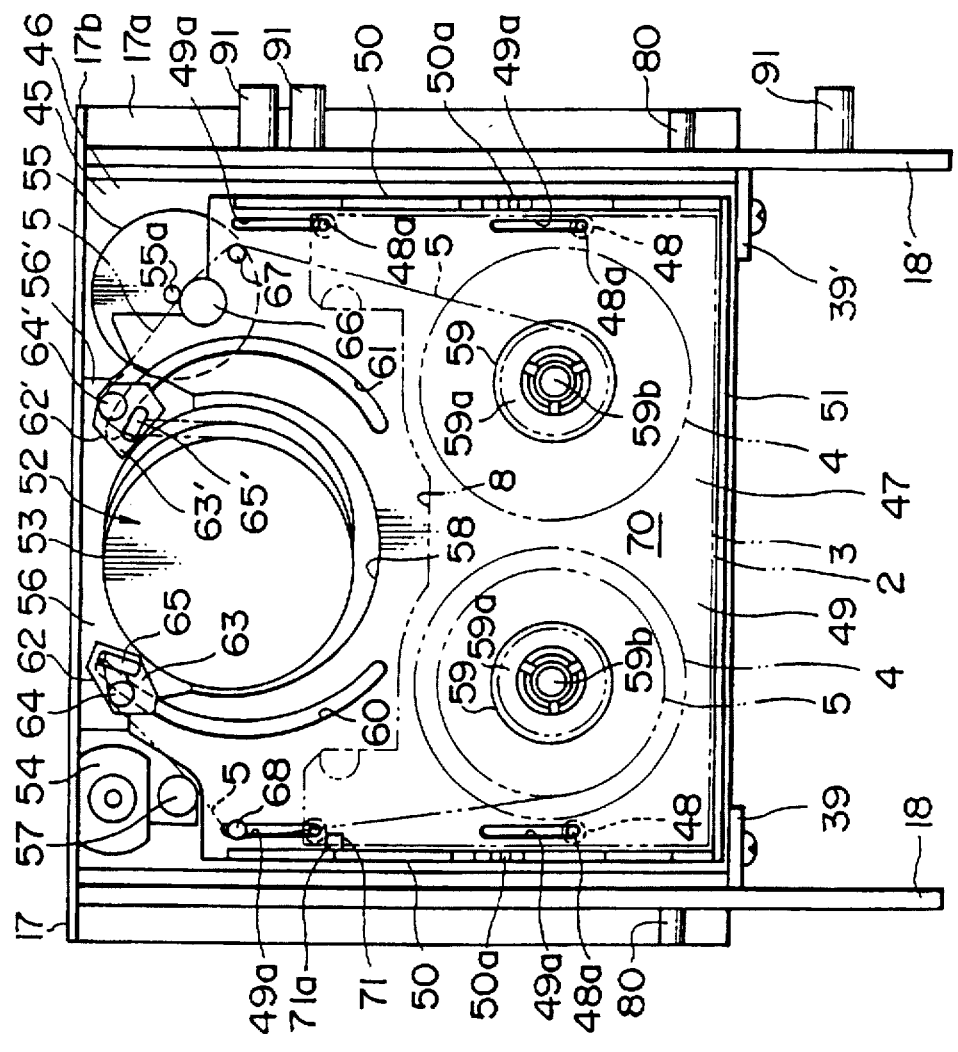
FIG. 6 is a top view illustrating a state with the slide chassis retracted from a state shown in FIG. 4.

That is, the slide chassis 47 is moved between a drawn-out position at which the engaging projections 48a of the guide pins 48 are positioned at the back ends of the guide grooves 49a as shown in FIG. 5 and a retracted position at which the engaging projections 48a of the guide pins 48 are positioned at front ends of the guide grooves 49a as shown in FIG. 6. At the retracted position, the slide chassis 47 in its entirety overlaps the fixed chassis 46.

The main portion 46a of the fixed chassis 46 is provided on its upper surface with a recording and/or reproducing portion 52. The recording and/or reproducing portion 52 is includes from its center toward the back end a head drum 53. On the left side of the head drum 53, a slide motor 54 is fixed on the chassis; on the right side, a capstan motor 55 is fixed. From the capstan motor 55, a capstan 55a projects upward.

Guide members 56, 56' are provided to guide a tape loading block to be described and are disposed so as to generally approach the head drum 53 from its back. Each of the guide members 56, 56' tilts up to the right.

The guide members 56, 56' are formed with guide grooves 56a, 56'a for guiding the above-mentioned tape loading block.

In front of the slide motor 54, a fixed tape guide 57 stands.

Although not shown in detail, the head drum 53 is composed of a fixed drum fixed to the fixed chassis 46, a rotary drum rotatably supported by the fixed drum, and a plurality of magnetic heads that are supported by the rotary drum and located between the fixed drum and the rotary drum and move along an external periphery of the head drum 53. When the magnetic tape 5 is recorded or reproduced, the rotary drum is driven at a relatively high speed by a drum motor, not shown.

The slide chassis 47 is driven by a drive mechanism composed of the slide motor 54 and a train of gears, not shown, disposed on the fixed chassis 46.

The main portion 49 of the slide chassis 47 is formed at its center back end with a relatively large "U"-shaped recess 58 opening backward. Referring to FIG. 6, when the slide chassis 47 moves to the retracted position, the head drum 53 is positioned inside the recess 58.

Reel bases 59, 59 are provided on which the tape reels 4, 4 are engaged. The reel bases 59, 59 are composed of generally disc-shaped reel resting portions 59a, 59a and reel engaging shafts 59b, 59b projecting up from the reel resting portions at their centers.

At left and right sides of the recess 58 of the main portion 49 of the slide chassis 47, guide grooves 60 and 61 open at their ends are provided extending in the front-back direction in a generally arc shape.

Tape loading blocks 62, 62' are provided and composed of movable bases 63, 63', guide rollers 64, 64' supported by the movable bases, and movable tilt guides 65, 65'. Before the slide chassis 47 reaches the retracted position, the tape loading blocks 62, 62' are movably supported by the guide grooves 60 and 61, respectively.

A pinch roller 66, a supply guide 67, and a tension regulating pin 68 are arranged on pivotal arms, not shown, at their pivotal ends in a standing manner. A base end of each pivotal arm is pivotally supported on the slide chassis 47. The initial state, or when the slide chassis 47 is at the draw-out position, the pinch roller 66 is positioned at the right of the tape loading block 62', the supply guide 67 is positioned generally at the right of the pinch roller 66, and the tension regulating pin 68 is positioned at the left of the left tape loading block 62.

As mentioned above, the reel bases 59, 59 are positioned in a space 70 inside the slide chassis 47. The space 70 provides a cassette mounting portion in which the tape cassette 2 is detachably mounted.

When the tape cassette 2 is mounted in the tape cassette mounting portion 70, reel engaging pins 59b, 59b of the reel bases 59, 59 are relatively inserted in reel base engaging holes of the tape reels 4, 4, thereby rotatably coupling the reels 4, 4 with the reel bases 59, 59 in integral manner.

When the tape cassette 2 is mounted in the cassette mounting portion 70, the above-mentioned guide rollers 64, 64', the movable tilt guides 65, 65', the pinch roller 66, the supply guide 67, and the tension regulating pin 68 are positioned inside the magnetic tape 5 positioned in front of the cassette case 3, or in the mouth 8 of the tape cassette 2 as shown in FIG. 5.

A second lid-opening member 71 is provided for moving the above-mentioned front lid 9 and the back lid 10 of the tape cassette 2 to a fully open position. The second lid-opening member 71 is integrally formed line the slide chassis 47 by folding the rear end of the left wall of the slide chassis toward the cassette mounting portion 70. A top end of the second lid-opening member 71 is bent in an arc form into an abutting portion 71a.

Main portions 73, 73 of loading arms 72, 72' provided for moving the cassette holder 19 are each integrally molded of synthetic resin. These loading arms 72, 72' are horizontally symmetric with each other.

Main portions 73, 73 of the loading arms 72, 72' are relatively thick discs formed at their peripheral ends with arm portions 74, 74 protrusively. The arm portions 74, 74 extend in a radius direction of the main portions 73, 73.

Referring to FIG. 16, the arm portions 74, 74 are formed along their length and generally at their center with engaging long holes 75, 75. The second guide pins 30, 30 of the housing 24 are slidably engaged at their tops in these engaging long holes 75, 75.

Figure 15:
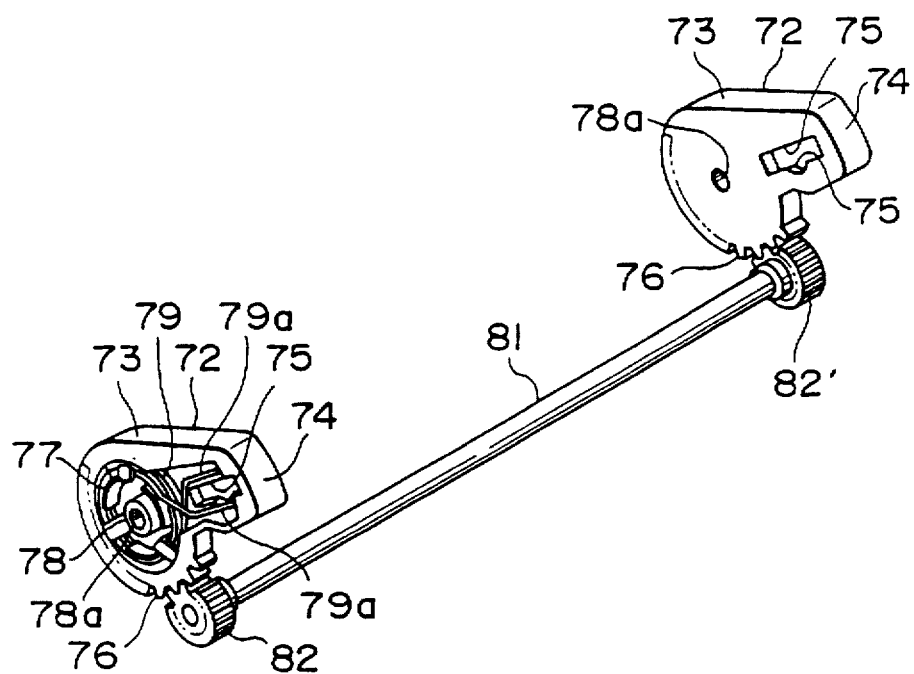
FIG. 15 is a perspective view of a loading arm.

Referring to FIG. 15, gears 76, 76 are formed on the main portions 73, 73 on their peripheral surfaces. Spring mounting recesses 77, 77 are provided on loading arms 72, 72 on their external surfaces. The spring mounting recesses 77, 77 consists of a portion circularly extending along bosses 78, 78 formed at the center of the main portions 73, 73 and a portion extending, continuously from the above-mentioned portion, along the width of the long holes 75, 75. Torsion springs 79, 79 are mounted in the spring mounting recesses 77, 77.

Referring to FIG. 16, the engaging long holes 75, 75 are formed on their lower surface at generally the midpoint with semicircular notches 75a, 75a.

Arms 79a, 79a of the torsion springs 79, 79 are abutted against the second guided pins 30, 30 engaged with the engaging long holes 75, 75 of the loading arms 72, 72'.

Figure 24:
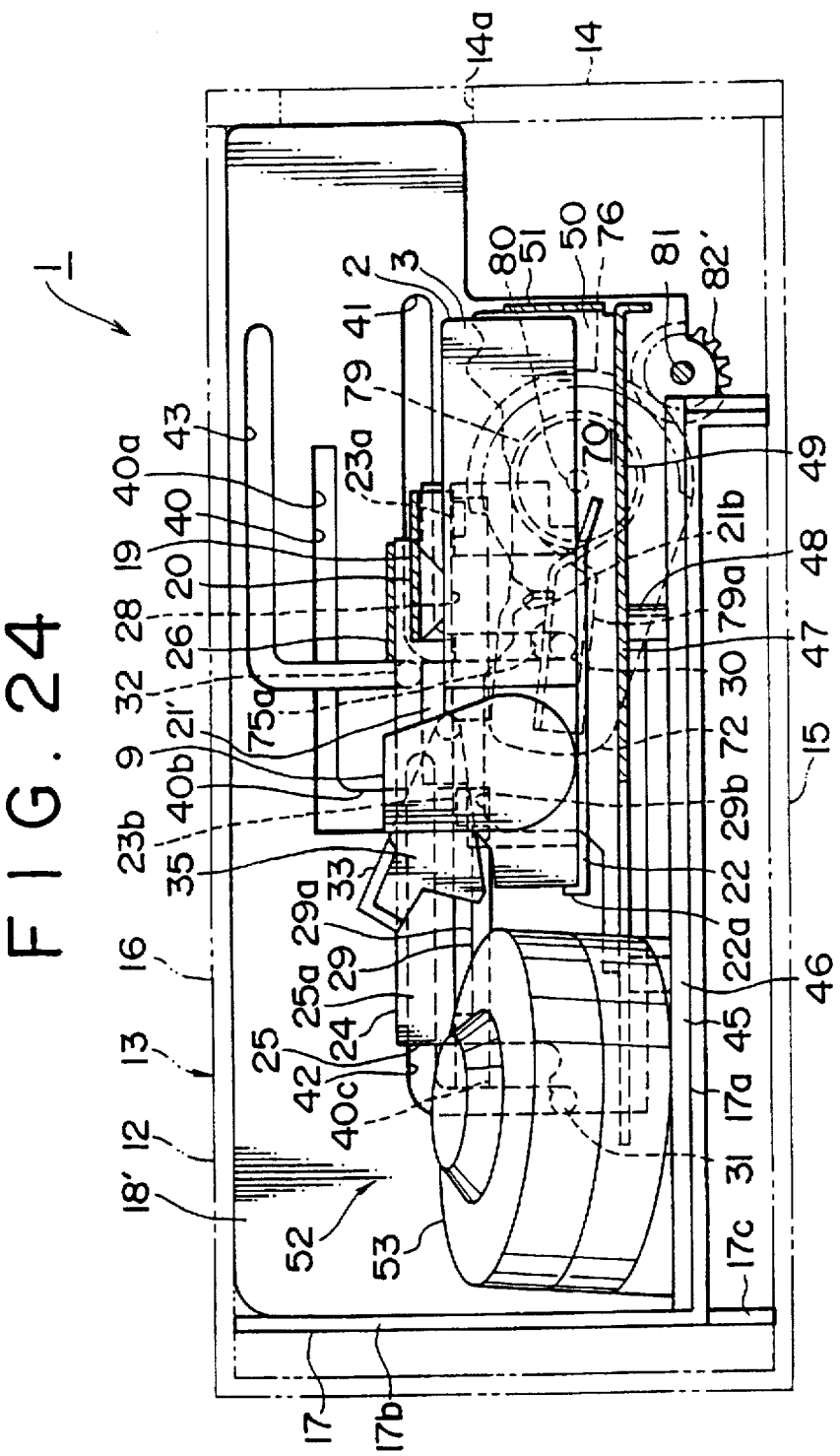
FIG. 24 is a side view illustrating the main portion of the cassette loading mechanism in a state subsequent to the state of FIG. 23.

Referring to FIG. 24, when the loading arms 72, 72' pivotally moves to a position shown in the same figure, the housing comes to a lowest position and the notches 75a, 75a of the engaging long holes 75, 75 are positioned immediately over the second guide pins 30, 30.

An overstroke operation of the loading arms 72, 72' causes the guide pins 30, 30 to partially enter the notches 75a, 75a to be pressed by the arms 79a, 79a of the torsion springs 79, 79, thereby stably holding the housing 24 in the lower position.

It should be noted that the bosses 78, 78 are formed at their center with through-holes 78a, 78a. The support walls 18, 18' are formed at lower ends toward front ends of their external surfaces with support shafts 80, 80 protruding horizontally outside. The support shafts 80, 80 are passed through the through-holes 78a, 78a of the bosses 78, 78 to pivotally support the loading arms 72, 72' on the support walls 18, 18'.

A rotary shaft 81 is rotatably supported at its two ends on the support walls 18, 18'. The rotary shaft 81 is fixed at its ends protruding from the support walls 18, 18' with drive gears 82, 82'. The drive gears 82, 82' mesh with the gear portions 76, 76 provided on the loading arms 72, 72'.

The right support wall 18' is attached at an inner surface of its rear end with a motor 83. A rotary shaft of the motor 83 protrudes through the support wall 18' and is fixed at its protruding end with a pinion gear 84.

A drive portion 85 is provided in which gears 87, 88, 89, 90 are arranged on the left surface of the support plate 86. The gear 87 located at the rear end of the support plate 86 meshes with the above-mentioned pinion gear 84, thereby providing a reduction gear train composed of gears 87, 88, 89 and 90 in this order.

The support plate 86 of the drive portion 85 is mounted, by means of screws, to bosses 91, 91, 91 provided on the left side of the support wall 18'. Thus, a space sufficient for rotary operation of the gears 87, 88, 89 and 90 is provided between the support wall 18' and the support plate 86, thereby allowing the gear 87 at the rear end to mesh with the pinion gear 84 and the gear 90 at the front end mesh with the drive gear 82'.

Consequently, when the motor 83 rotates, the drive gear 82' is rotated via the above-mentioned gear train, thereby rotating the drive gear 82 fixed on the same shaft as the drive gear 82'.

When the drive gears 82, 82' rotate, the loading arms 72, 72' on both sides are pivotally moved in synchronization with these drive gears.

As will be described, the cassette holder 19, the housing 24, the support walls 18, 18', the motor 83, and the drive portion 85 constitute a first loading mechanism. The mechanical chassis 45 composed of the fixed chassis 46 and the slide chassis 47 provides a second loading mechanism.

The guide pins 30, 30 of the housing 24 are slidably engaged at their ends with the engaging long holes 75, 75 formed on the loading arms 72, 72'. Therefore, when the loading arms 72, 72' are pivotally moved counterclockwise when viewed from the left side (this moving direction is hereinafter referred to as a loading direction), the second guide pins 30, 30 are pressed in the loading direction by the long engaging holes 75, 75 at one of their side rims, or the lower rims when viewed from a state in which the long engaging holes 75, 75 are at the position shown in FIG. 16. This first moves the housing 24.

Consequently, the cassette holder 19 held by the housing 24 is moved toward the loading completed position. And when the loading arms 72, 72' are pivotally moved in a direction opposite to the loading direction, or clockwise when viewed from the left side, the second guide pins 30, 30 are pressed toward the loading direction by the long engaging holes 75, 75 at the other side rims. This moves the cassette holder 19 held on by the housing 24 toward an eject position.

Figure 20:
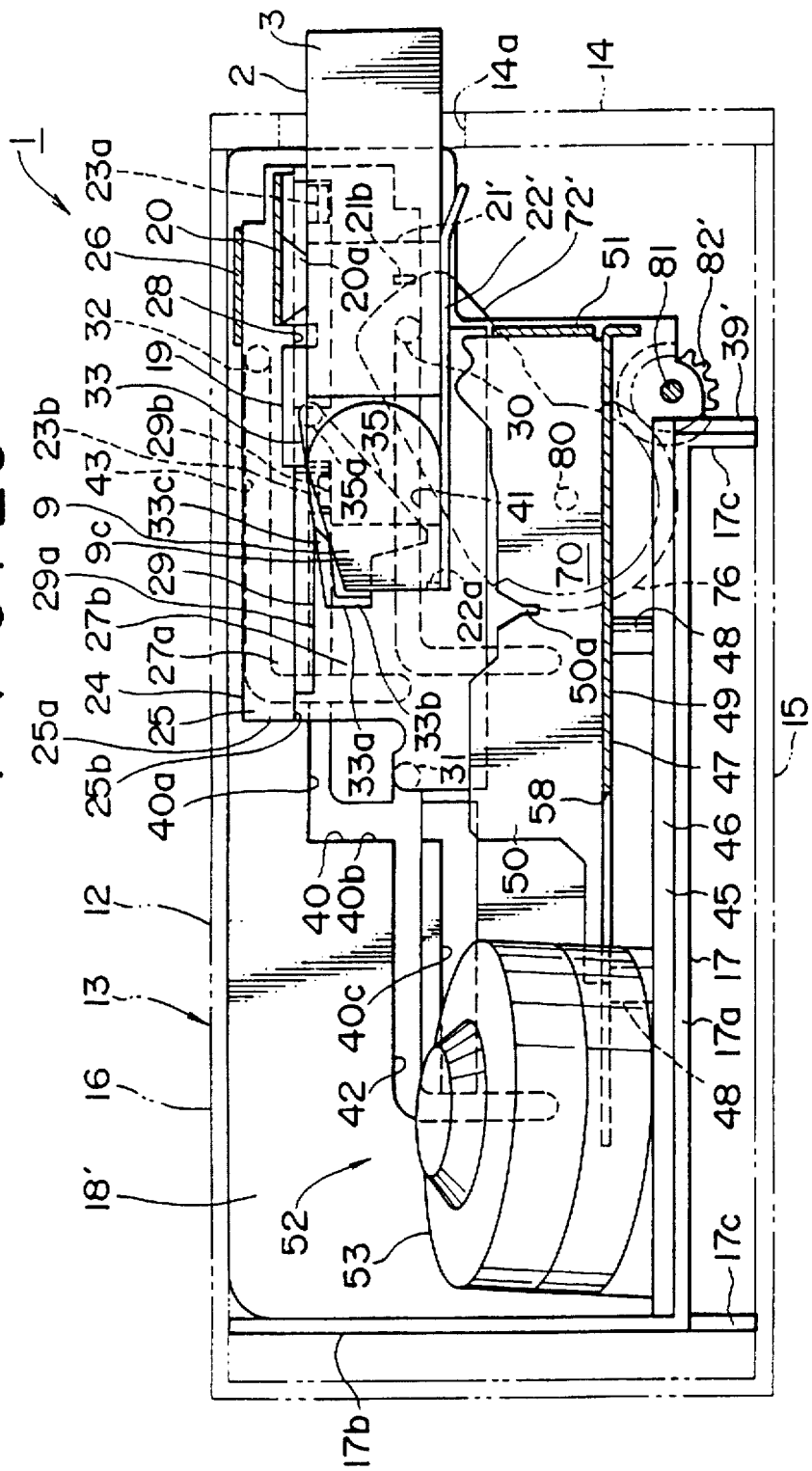
FIG. 20 is a side view illustrating the main portion of the cassette loading mechanism with the tape cassette just loaded.

In an initial state in which cassette loading has not been performed, the loading arms 72, 72' are at their initial position shown in FIGS. 16 and 20; that is, the position at which their arm portions 74, 74 are directed slightly upward. In this state, the housing 24 and the cassette holder 19 are positioned at the eject position.

A cassette loading operation by the above-mentioned cassette loading mechanism is performed as follows:

The cassette loading operation starts when the tape cassette 2 is fully inserted in the cassette holder 19.

To be specific, when the tape cassette 2 has been fully inserted in the cassette holder held at the eject position, the insertion is detected by a detector, not shown, to drive the motor 83, which in turn drives the loading arms 72, 72' in the loading direction.

As described earlier, the lid-opening preventing lock is unlocked when the tape cassette 2 has been fully inserted in the cassette holder 19, so that the front lid 9 is ready to open only with application of a force to it from below.

When the loading arms 72, 72' are pivotally moved in the loading direction, the cassette holder 19 and the housing 24 are drawn toward the loading completed position, while the tape cassette 2 placed on the cassette holder 19 opens its lid to be guided to the loading completed position.

When drawing-in of the cassette holder 19 starts, the fifth guide pin 36 of the first lid-opening member 33 is guided from the horizontal portion 44a of the fifth guide groove 44 of the support wall 18 along the intermediate portion 44c and upward.

The first lid-opening member 33 is pivotally moved up backward around positions of the engaging pins 34b and 35b of the arms 34 and 35 supported by the engaging holes 21c, 21c of the side plates 21, 21' of the cassette holder 19.

The lid-opening projection 37 formed on the lower end of the left arm 34 is abutted from below against the lower rim of the side portion 9c of the front lid 9 of the tape cassette 2.

When the cassette holder 19 is further drawn in backward, the fifth guide pin 36 of of the first lid-opening member is guided from the intermediate portion 44c of the fifth guide groove 44 into the horizontal portion 44b. While the fifth guide pin 36 is guided through the intermediate portion 44c of the fifth guide groove 44, the lid-opening projection 37 of the first lid-opening member 33 pushes up the front lid 9 of the tape cassette 2. While the fifth guide pin 36 is guided through the horizontal portion 44b of the fifth guided groove 44, the lower rim of the main portion 9a of the front lid 9 is held at a certain height.

Figure 21:
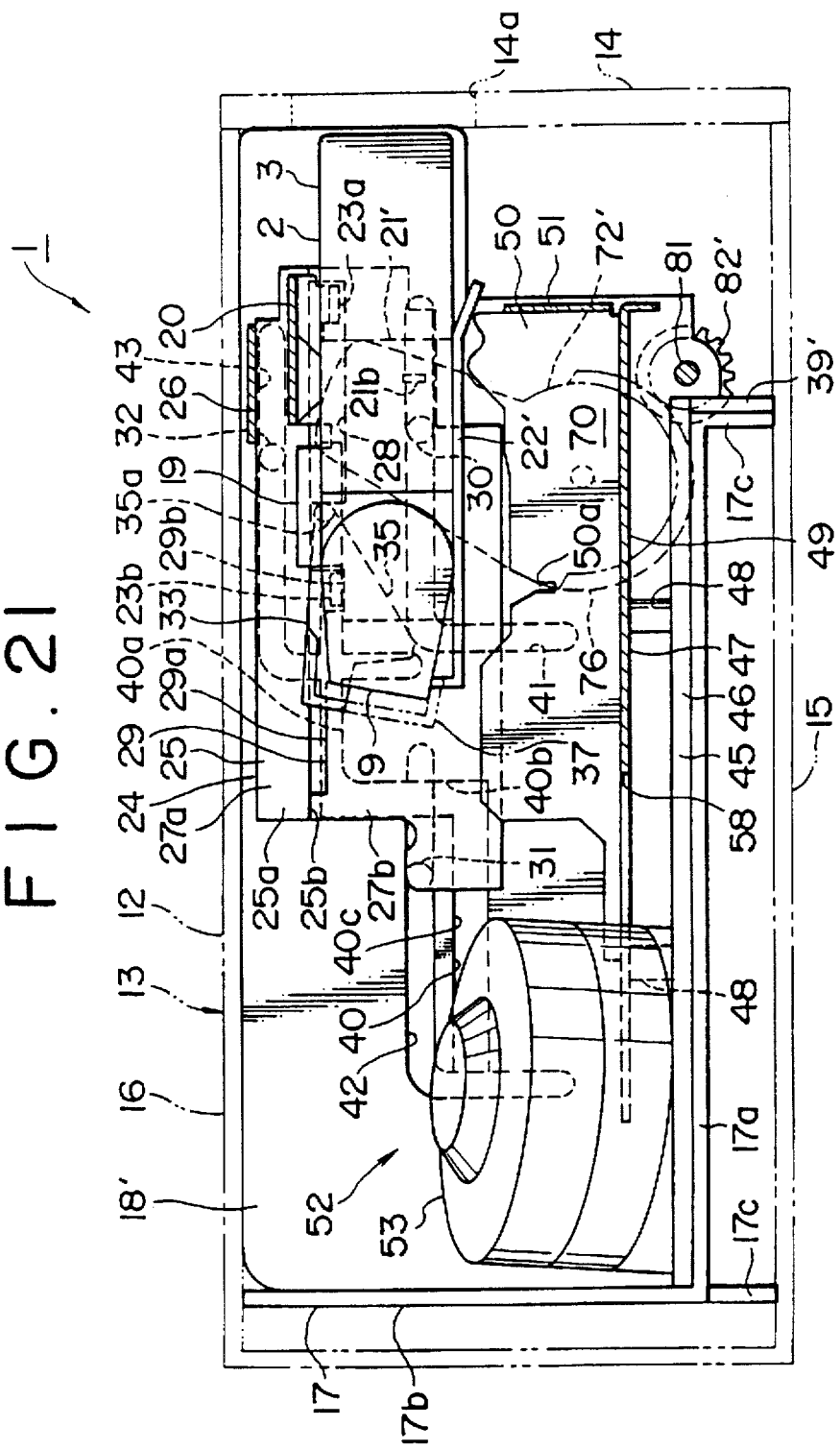
FIG. 21 is a side view illustrating the main portion of the cassette loading mechanism in a state subsequent to the state of FIG. 20.
Figure 22:
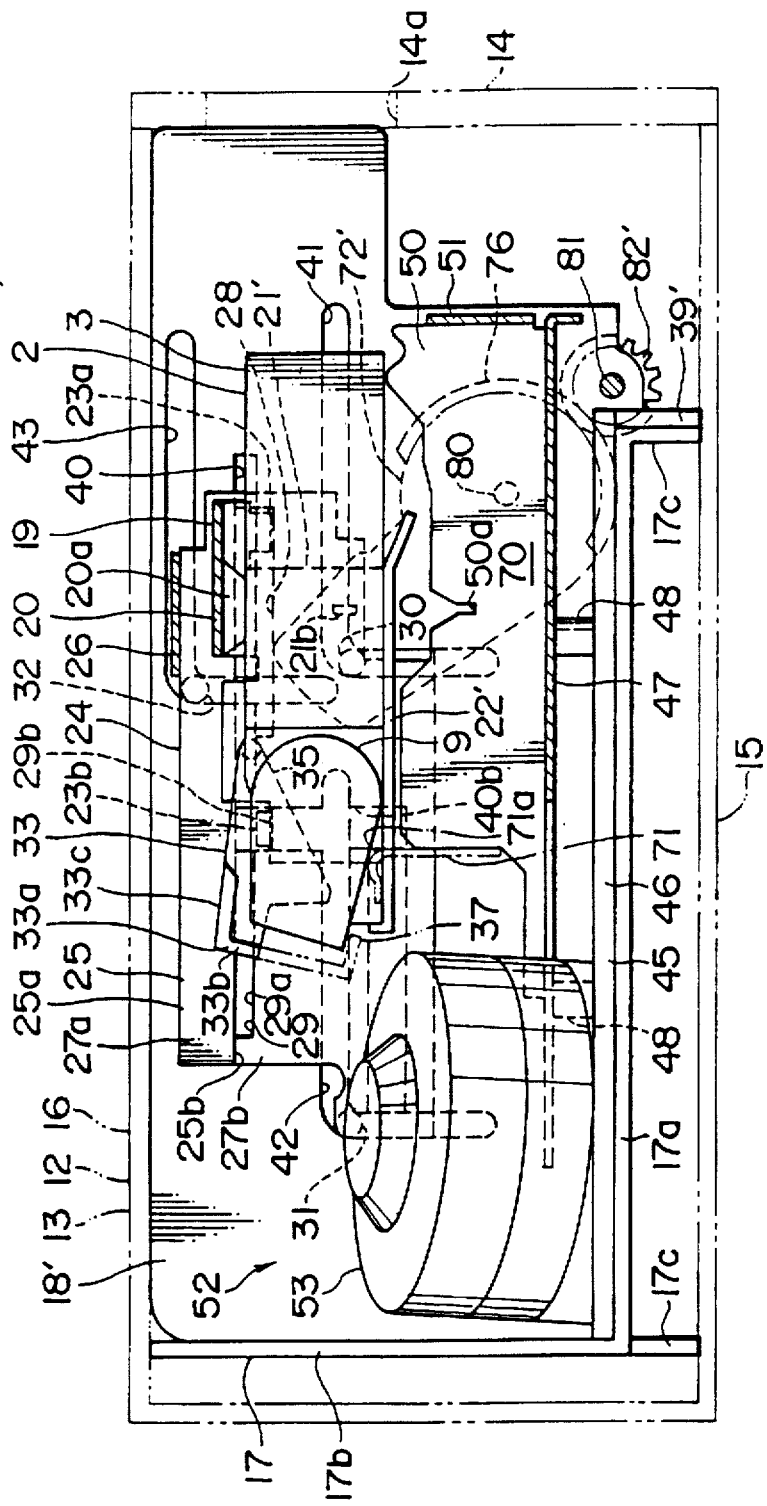
FIG. 22 is a side view illustrating the main portion of the cassette loading mechanism in a state subsequent to the state of FIG. 21.

In the above-mentioned state, the lower rim of the main portion 9a of the front lid 9 is slightly raised as shown in FIGS. 21 and 22. This position prevents the front lid 9 from butting the top of tape draw-out members such as the pinch roller 66 located under the front lid 9. When the front lid 9 reaches the butting preventing position, the back lid 10 opens or closes in synchronization with a pivotal movement of the front lid 9, thereby positioning the lower rim of the back lid 10 generally at the same height as the lower rim of the front lid 9.

This prevents the lower rims of the front lid 9 and the back lid 10 from butting the tape draw-out members such as the pinch roller 66 while the tape cassette is moved backward horizontally, thereby smoothly positioning the tape draw-out members below the mouth 8 of the tape cassette 2.

It should be noted that preventing the front lid 9 and the back lid 10 from butting the top of the tape draw-out members when the tape cassette 2 has been drawn in backward horizontally can draw in the tape cassette 2 down to a relatively deeper level in the tape player 13, thereby thinning the tape player 13 in construction. As shown in FIGS. 21 and 22, the front lid 9 and the back lid 10 project only slightly relative to the upper surface of the tape cassette 2 when the front lid 9 and the back lid 10 have been raised to the butting preventing position, not affecting the thinning of the tape player 13.

Since the cassette holder 19 is held by the housing 24, when the housing moves along the guide grooves 41, 41, 42, 42, 43, 43 formed in the support walls 18, 18', the cassette holder 19 also moves along the same locus as the housing 24.

While the guide pins 30, 30, 31, 31, 32, 32 of the housing 24 are moving through the horizontal portions of the guide grooves 41, 41, 42, 42, 43, 43, the first guide pins 23b, 23b of the cassette holder 19 are positioned in the upper horizontal portions 40a, 40a of the first guide grooves 40, 40 of the support walls 18, 18' through the stopper portions 29b, 29b of the slide grooves 29, 29 of the housing 24. A width of the stopper portions 29b, 29b is generally the same as that of the first guide pins 23b, 23b.

Since the height of the upper horizontal portions 40a, 40a of the first guide grooves 40, 40 are generally the same as that of the first guide pins 23b, 23b of the cassette holder 19, the first guide pins 23b, 23b positioned in the stopper portions 29b, 29b of the housing 24 will not come off upward while the housing 24 is moving horizontally.

Further, when the loading arms 72, 72' move pivotally, the guide pins 30, 30, 31, 31, 32, 32 of the housing 24 move to the vertical downward portions of the guide grooves 41, 41, 42, 42, 43, 43 of the support walls 18, 18'.

At the same time, the lid-opening projection 37 of the first lid-opening member 33 abutting against the lower rim of the side 9c of the front 9 of the tape cassette 2 further relatively pushes up the front lid 9 because the fifth guide pin 36 of the first lid-opening member 33 is positioned in the horizontal portion 44b of the fifth guide groove 44 as described above and the housing goes down vertically. Since the first lid-opening member 33 is pivoted in an upper front of the pivot of the front lid 9 as shown in FIGS. 21 and 22 and a distance from the pivot to the lid-opening projection 37 is greater than a distance from the pivot of the front lid 9 to the lower end rim of the side 9c at a pivot end, the lid-opening projection 37 of the first lid-opening member 33 goes off upward earlier than the lower rim of the side 9c of the front lid 9, thereby detaching from the side 9c.

However, referring to FIG. 22, since the slide chassis having the cassette mounting portion 70 waiting below is formed with the lid-opening member 71 standing from the side wall 50 of the slide chassis 47, the projection 71a of the second lid-opening member 71 abuts the lower rim of the side 9c of the front lid 9 before the projection 37 of the first lid-opening member 33 comes off the lower rim of the side 9c of the front lid 9.

Figure 23:
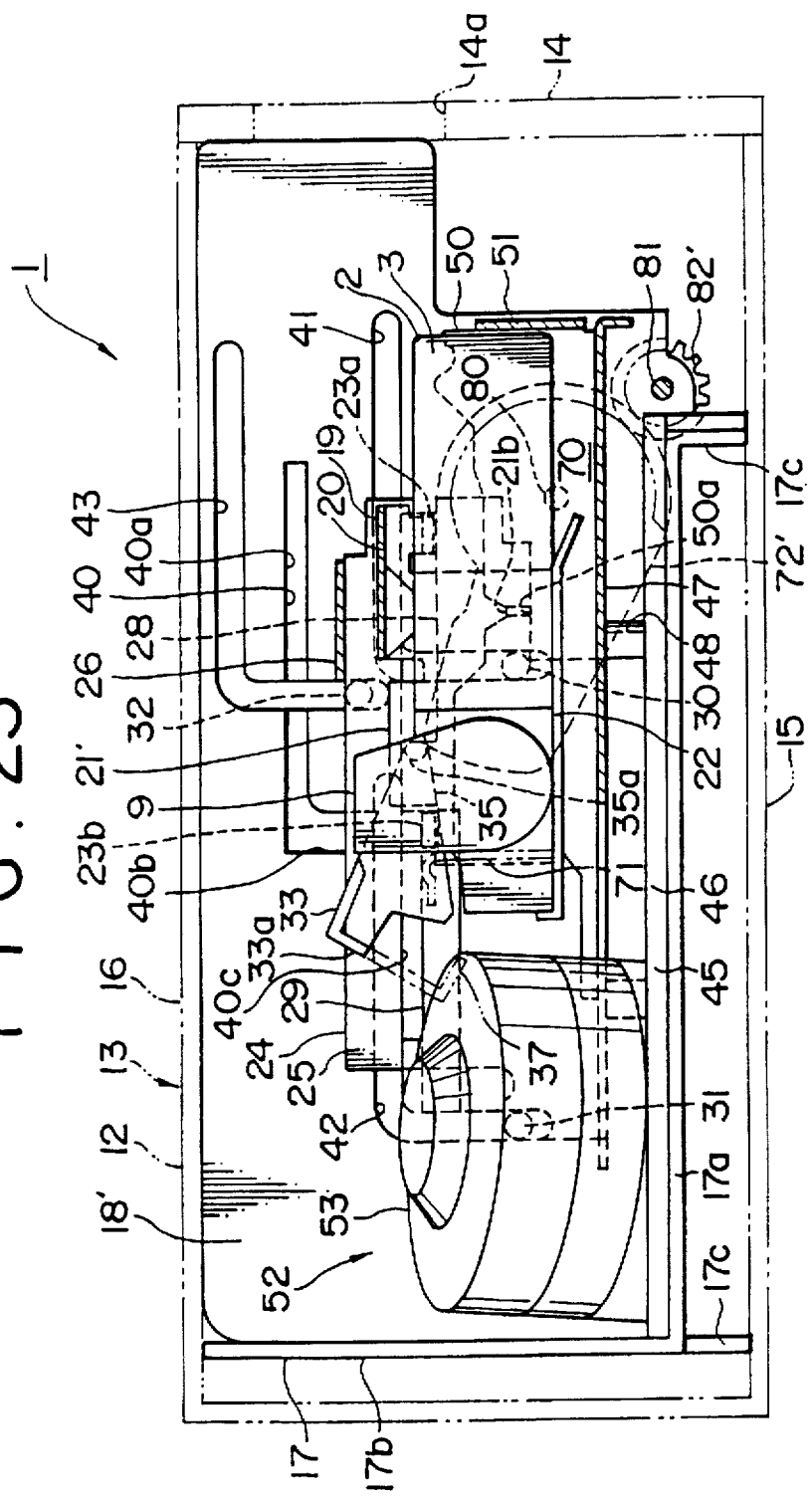
FIG. 23 is a side view illustrating the main portion of the cassette loading mechanism in a state subsequent to the state of FIG. 22.

As the guide pins 30, 30, 31, 31, 32, 32 of the housing 24 go down the vertical portions of the guide grooves 41, 41, 42, 42, 43, 43, the tape cassette 2 held by the housing 24 and the cassette holder 19 is positioned in the cassette mounting portion 70 and the front lid 9 and the back lid 10 open, fully opening the mouth 8 at its front and lower sides as shown in FIG. 23.

At this time, engaging pieces protruding outside the outer surfaces 21a, 21a of the cassette holder 19 are engaged with engaging slits 50a, 50a formed on the side walls 50, 50 of the slide chassis 47 and the reel engaging pins 59b, 59b of the reel bases 59, 59 are engaged with engaging holes opening toward the lower side of the tape reel of the tape cassette 2.

When the lower ends of engaging pieces 21b, 21b of the cassette holder 19 abut the bottom surfaces of the engaging slits 50a, 50a of the slide chassis 47, the guide pins 30, 30, 31, 31, 32, 32 of the housing 24 are not yet abutting the bottom ends of the vertical portions of the guide grooves 41, 41, 42, 42, 43, 43.

When the loading arms 72, 72' pivotally move to a position shown in FIG. 24, the second guide pins 30, 30 of the housing 24 engaged with the long engaging holes 75, 75 of the loading arms 72, 72' are positioned at the bottom end of the vertical portions of the second guide grooves 41, 41', thereby positioning the housing 24 to the lowest level.

When the housing 24 goes down to the lowest level, the engaging pieces 21b, 21b of the cassette holder 19 are engaged with the engaging slits 50a, 50a of the slide chassis 47 to prevent the housing 24 from going down further, thereby positioning the guide pins 23a, 23a and 23b, 23b at relatively upper portions of the slide grooves 28, 28 and 29, 29.

The guide pins 23b, 23b are relieved from the stopper portions 29b, 29b of the slide grooves 29, 29 to become slidable.

Then, by means of a switching unit, not shown, the first loading operation described above is switched to a second loading operation.

As described above, when the engaging pieces 21b, 21b of the cassette holder 19 are completely engaged with the engaging slits 50a, 50a of the slide chassis 47 and are slidable in the slide grooves 28, 28, 29, 29, a limit switch, not shown, stops the motor 83, upon which the loading arms 72, 72' hold the housing 24 at that position.

Then, the switching unit, not shown, drives the slide motor 54 to move the slide chassis toward the retracted position by means of the gear train, not shown.

The slide chassis 47 moves to the retracted position while holding the cassette holder 19 that holds the tape cassette 2. Since the engaging pieces 21b, 21b protruding from the side plates 21, 21 of the cassette holder 19 are positioned at the lower sides of the shoulders 25b, 25b formed on the side plates 25, 25 of the housing 24, the engaging pieces 21b, 21b will not touch inner surfaces 26a, 26a of the side walls 26, 26 when the cassette holder 19 moves backward.

When the slide chassis 47 is moved to the retracted position, the head drum 53 is put in the mouth 8 of the cassette case 3 as shown in FIG. 6 with a front end of the head drum 53 positioned between two tape reels 4, 4. The magnetic tape 5 is wound around the head drum 53 at a front portion on the external periphery of the drum 53 and around each tape guide and capstan.

Referring to FIG. 6, when the slide chassis 47 comes to the retracted position, the left guide groove 60 of the slide chassis 47 connects with the guide groove 56a of the left guide member 56 provided on the fixed chassis 46 and the right guide groove 61 of the slide chassis 47 connects with the guide groove 56a' of the right guide member 56' of the fixed chassis 46.

When viewed from the above-mentioned state, the loading block 62 on the left side moves to the loading completed position behind the head drum 53 via the left guide groove 60 and the guide groove 56a; the loading block 62' on the right side moves to the loading completed position via the right guide groove 61 and the guide groove 56'.

When the slide chassis 47 starts moving toward the retracted position, a supply arm provided with the supply guide 67 is pivotally moved slightly backward by a guide cam, not shown, thereby winding the magnetic tape 5 around the supply guide 67. At the same time, a tension regulator arm provided with the tension regulating pin 68 is relieved from its initial position and is pivotally moved generally backward by a tension spring, not shown, to wind the magnetic tape 5 around the tension regulating pin 68. The magnetic tape 5 is given a suitable tension by pivotal force applied to the tension regulating pin 68.

At generally the same time as the slide chassis reaches the retracted position, the pinch roller 66 is pressed against the capstan 55a with the magnetic tape 5 in between.

In the above-mentioned state, the tape loading has been completed, in which the magnetic tape 5 is threaded through a required path as shown in FIG. 6.

To be more specific, the magnetic tape 5 goes from a supply reel 4 and threaded along the tension regulating pin 68, the fixed tape guide 57, the guide roller 64, movable tilt guide 65, the head drum 53, the movable tilt guide 65', the guide roller 64', the capstan 55a, and the supply guide 67 in this order, and wound by a take-up reel 4. The magnetic tape 5 is wound around the head drum 53 generally in one turn in a spiral manner.

The magnetic tape 5 is recorded or reproduced in the above-mentioned state by feeding the tape by means of the capstan 55a and the pinch roller 66 and rotating the rotary portion of the head drum 53.

A cassette unloading operation, or ejecting the tape cassette 2 is performed by reversely following the above-mentioned steps.

That is, when an eject operation is commanded, the slide chassis 47 is moved to the draw-out position and a tape unloading operation is performed, or the tape is wound up by a tape reel.

To be specific, the tape loading blocks 62, 62' are moved toward the guide grooves 60, 61 of the slide chassis 47 to be returned thereto. Then, the slide chassis 47 is returned to the initial position, causing the head drum 53 to get out of the mouth 8 of the tape cassette 2 and the pinch roller 66, supply guide 67 and the tension regulating pin 68 to return to their respective initial positions.

Then, when the tape loading blocks 62, 62' start moving, the supply reel is rotated in the tape winding direction, thereby winding the magnetic tape 5 around the supply reel without slack.

The motor 83 and the drive portion 85 operate to pivotally move the loading arms 72, 72' in the direction opposite to the loading direction, causing the cassette holder 19 to return to the eject position by following the states shown in FIGS. 25, 24, 23, 22, 21 and 20 in this order. Thus, the tape cassette 2 is ready to be taken out of the tape player 13.

While preferred embodiments of the invention have been described using specific terms, such description is for illustrative purposes only, and it is to be understood that changes and variations may be made without departing from the spirit or scope of the appended claims.

What is claimed is:

1. A cassette loading mechanism of a linear skating type comprising:

a cassette holder disposed in a horizontal plane for detachably accommodating a tape cassette, said cassette holder being provided on a side thereof with first and second projecting portions;

a cassette holder holding member for holding said cassette holder, said cassette holder holding member being formed on a side thereof with a third projecting portion and a first grooved portion formed of a slit portion and a stopper portion for engagement with said first projecting portion formed on said cassette holder, when said first projecting portion engages said slit portion said cassette holder and said cassette holder holding member are movably connected with each other for relative movement in a horizontal plane and when said first projecting portion engages said stopper portion said cassette holder and said cassette holder holding member are fixedly connected for preventing relative movement in the horizontal plane;

a fixed chassis having a support wall formed with a second grooved portion for engagement with said first projecting portion of said cassette holder that extends through said first grooved portion formed in said cassette holder holding member, said support wall being further formed with a third grooved portion for engaging said third projecting portion of said cassette holder holding member and extending horizontally and vertically so that said cassette holder holding member is guided for movement in the horizontal plane and in a vertical plane; and a slide chassis mounted on said fixed chassis, said cassette holder holding member and said slide chassis being horizontally and vertically movable relative to said fixed chassis, said slide chassis having a vertically arranged fourth grooved portion for receiving therein said second projecting portion formed on said cassette holder, so that when said third projecting portion of said cassette holder holding member moves along a horizontal portion of said third grooved portion of said support wall said cassette holder and said cassette holder holding member move together with said first projecting portion of said cassette holder engaging said stopper portion of said first grooved portion of said cassette holder holding member, and when said cassette holder holding member moves along a vertical portion of said third grooved portion of said support wall and said second projecting portion of said cassette holder engages said fourth grooved portion of said slide chassis and reaches a bottom end of said fourth grooved portion, said first projecting portion of said cassette holder is disengaged from said stopper portion of said first grooved portion of said cassette holder holding member and said cassette holder is fixedly connected to said slide chassis by said second projecting portion engaging said fourth grooved portion, whereby said cassette holder and said slide chassis move together in a horizontal plane relative to said cassette holder holding member; further comprising:

a cassette lid opening member pivotally secured on said cassette holder, said cassette lid opening member being engaged with a lid of a tape cassette to be opened in operative association with a vertical movement of said cassette holder.

* * * * *